(12) United States Patent
Safdarnejad et al.

(10) Patent No.: US 10,573,052 B2
(45) Date of Patent: Feb. 25, 2020

(54) CREATING CINEMAGRAPHS WITH VIRTUAL LONG-EXPOSURE IMAGES

(71) Applicant: ADOBE INC., San Jose, CA (US)

(72) Inventors: Seyed Morteza Safdarnejad, San Jose, CA (US); Sarah Aye Kong, Cupertino, CA (US); Chih-Yao Hsieh, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/895,687

(22) Filed: Feb. 13, 2018

(65) Prior Publication Data
US 2019/0251729 A1    Aug. 15, 2019

(51) Int. Cl.
| | |
|---|---|
| *G06T 13/80* | (2011.01) |
| *G06T 5/00* | (2006.01) |
| *H04N 5/00* | (2011.01) |
| *G06T 7/00* | (2017.01) |
| *H04N 5/262* | (2006.01) |
| *H04N 5/232* | (2006.01) |
| *H04N 5/265* | (2006.01) |

(52) U.S. Cl.
CPC .............. *G06T 13/80* (2013.01); *G06T 5/002* (2013.01); *G06T 7/97* (2017.01); *H04N 5/23293* (2013.01); *H04N 5/265* (2013.01); *H04N 5/2625* (2013.01); *G06T 2200/24* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 10,127,632 | B1* | 11/2018 | Burke | G06T 3/4038 |
| 2004/0001071 | A1* | 1/2004 | Noyle | G06T 15/503 |
| | | | | 345/589 |
| 2014/0111662 | A1* | 4/2014 | Mashiah | G06T 13/80 |
| | | | | 348/220.1 |
| 2015/0346969 | A1* | 12/2015 | Strabbing | G06F 3/04845 |
| | | | | 715/723 |

OTHER PUBLICATIONS

Bai, Jiamin, et al. "Selectively de-animating video." ACM Trans. Graph. 31.4 (2012): 66-1. (Year: 2012).*

(Continued)

*Primary Examiner* — Nurun N Flora
(74) *Attorney, Agent, or Firm* — Shook, Hardy & Bacon, LLP

(57) ABSTRACT

Embodiments of the present invention are directed to facilitate creating cinemagraphs from virtual long-exposure images. In accordance with some embodiments of the present invention, virtual long-exposure image comprising a plurality of aligned frames is provided and a selection of a region of pixels in the virtual long-exposure image is received. Based on the selected region of pixels, a set of frames for animation is identified from the plurality of frames. The set of frames may be identified by automatically detecting a sequence of frames or by receiving a user selection of frames. The virtual LE image is combined with the set of frames to create a cinemagraph having a visible non-animated portion formed by the virtual LE image and a visible animated portion formed by the set of frames.

20 Claims, 27 Drawing Sheets

(56) References Cited

OTHER PUBLICATIONS

Gadget Hacks: How to Take Long Exposure Photos on Your iPhone iOS, https://ios.gadgethacks.com/how-to/take-long-exposure-photos-your-iphone-ios-11-0177938/, 5 pages.

Ron Martinsen's Photography Blog: Review—Flixel Cinemagraph—Motion Photos, http://www.ronmartblog.com/2015/02/review-flixel-cinemagraph-pro.html, 8 pages.

* cited by examiner

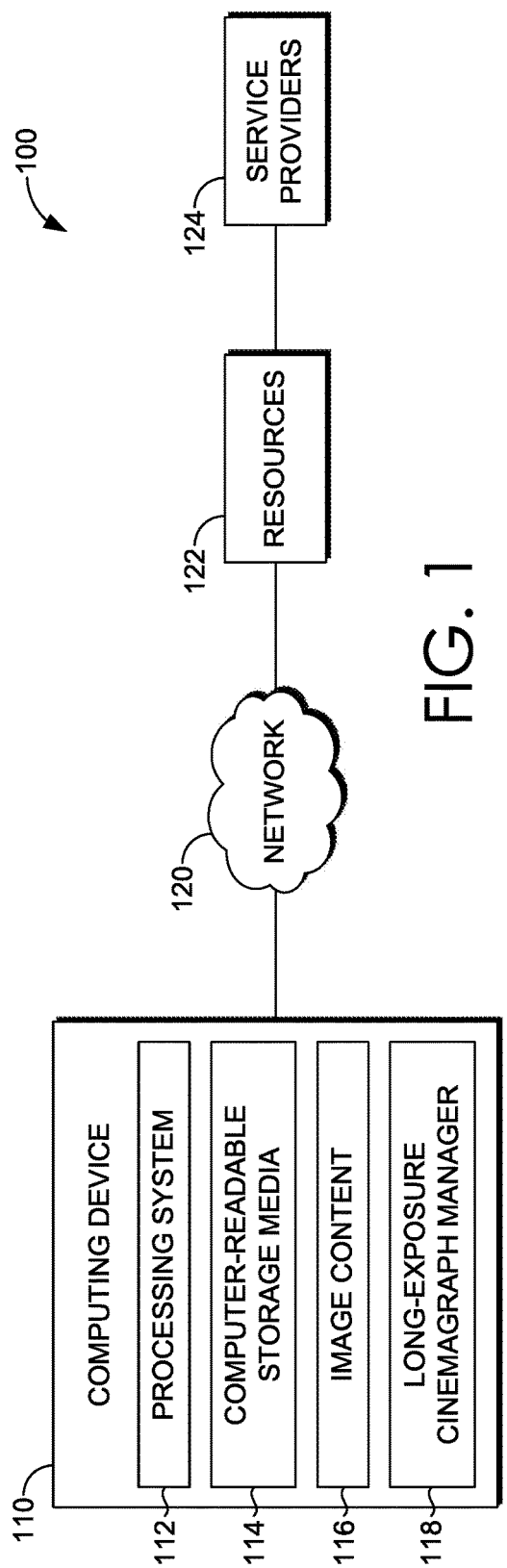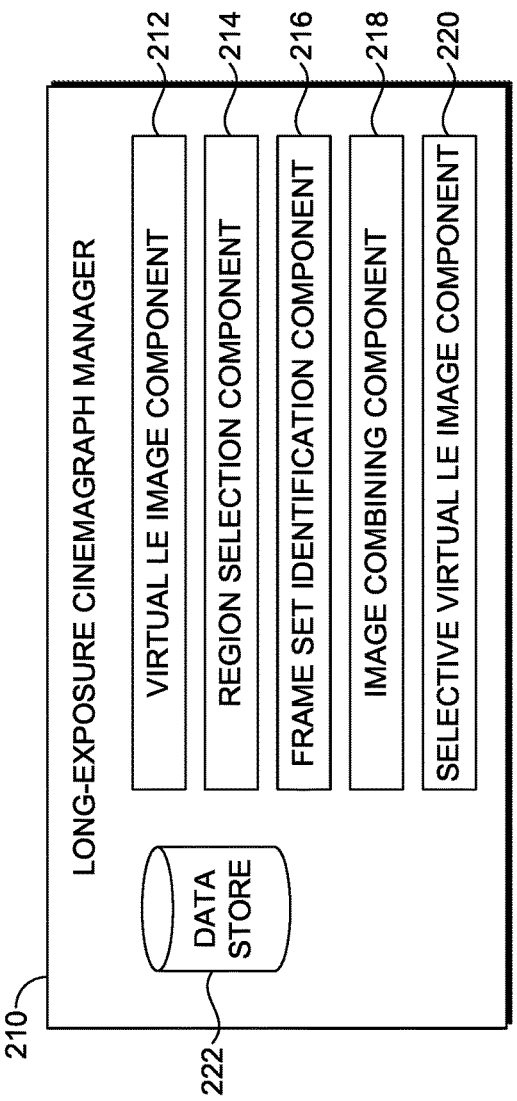

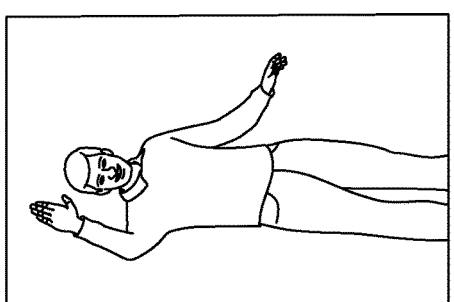
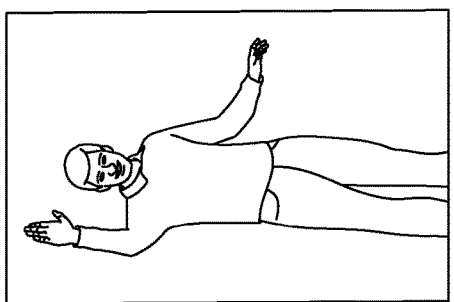
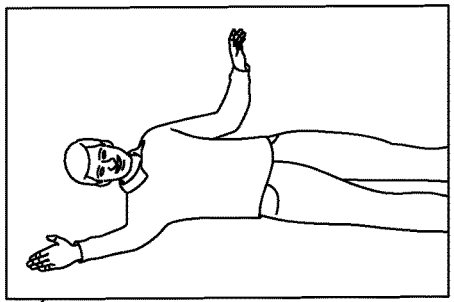
FIG. 3A
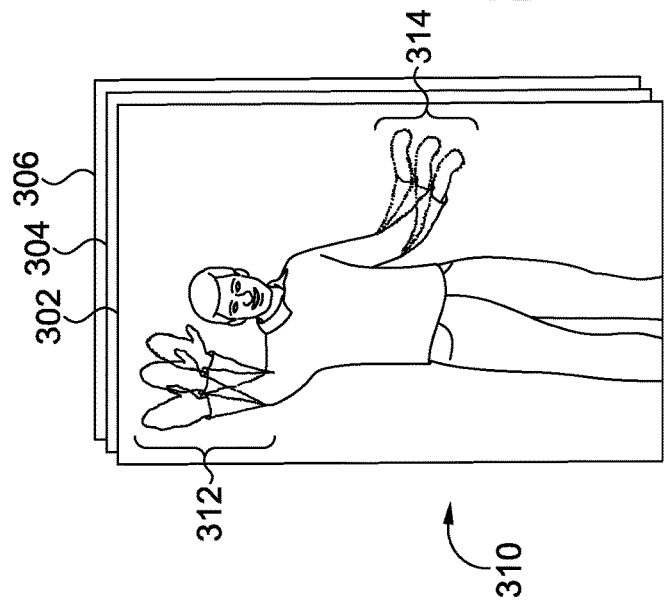
FIG. 3B

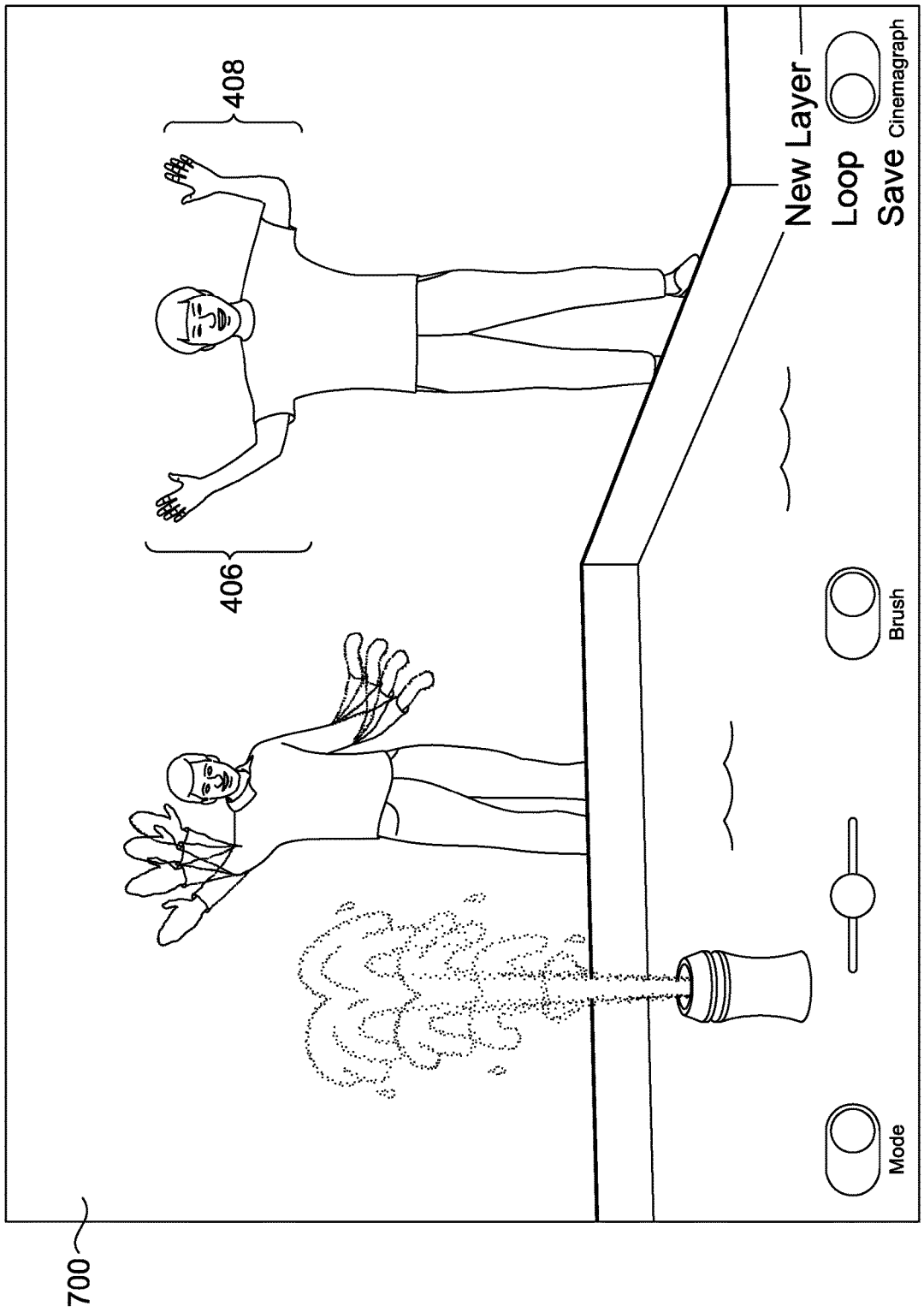

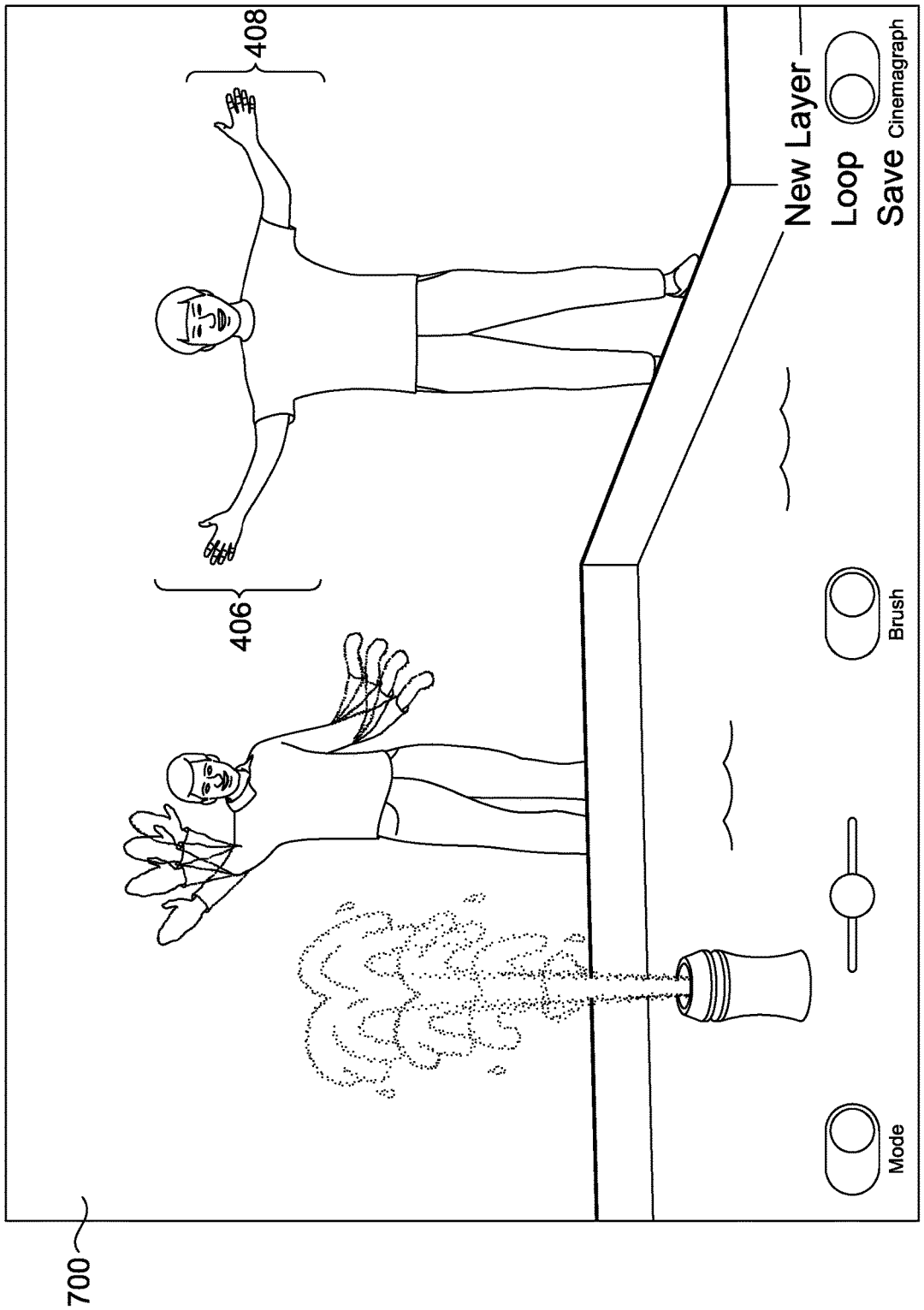

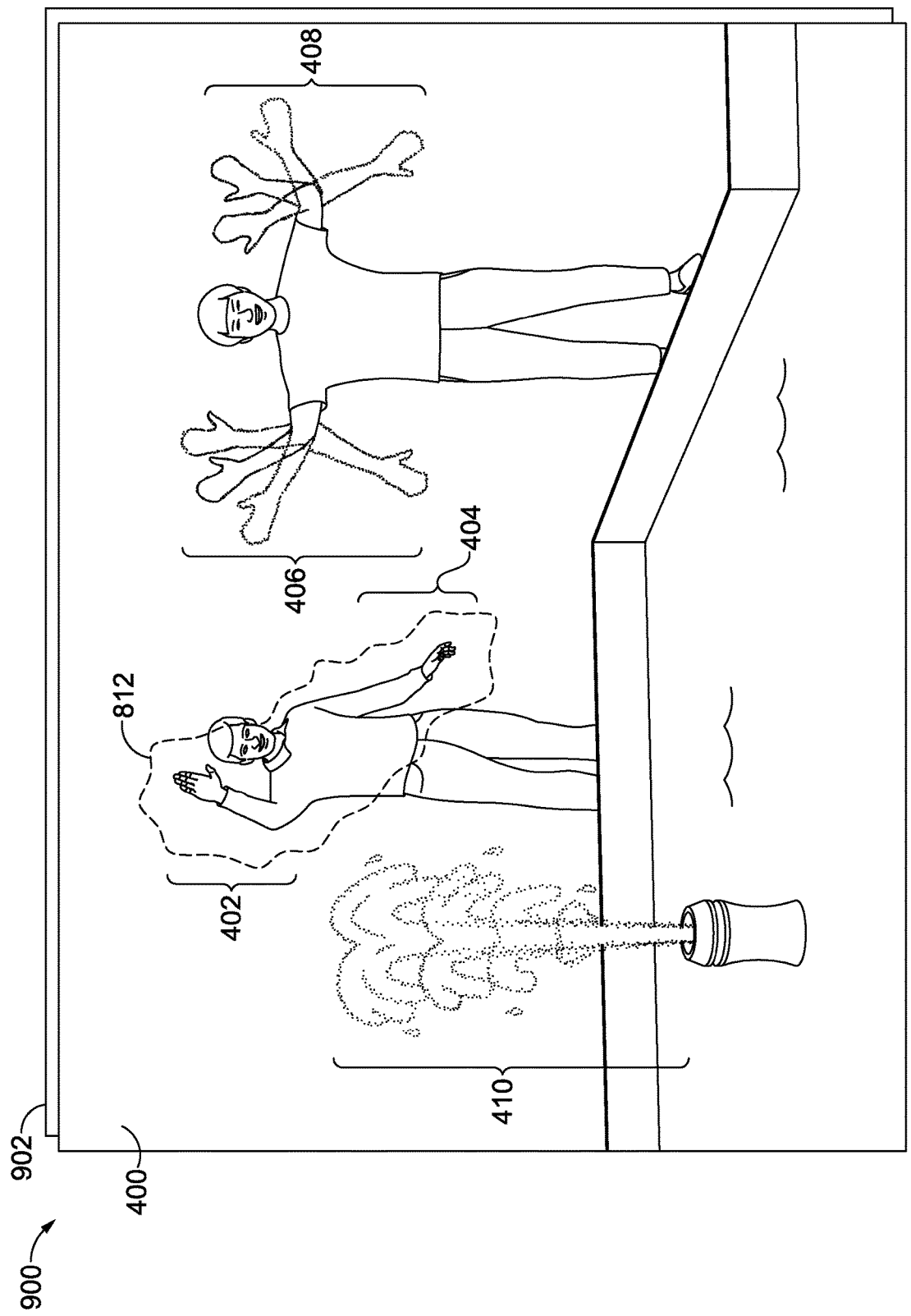

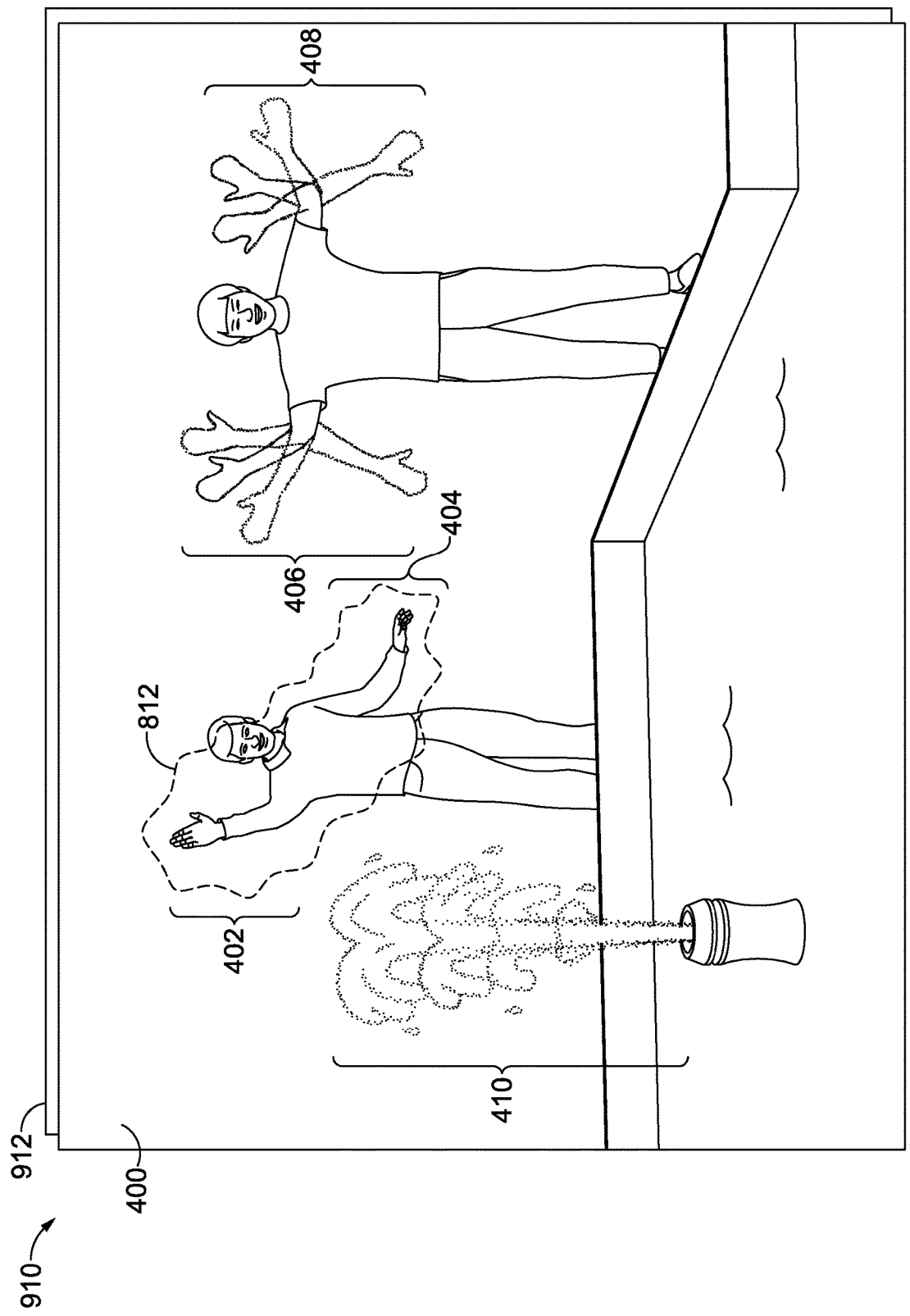

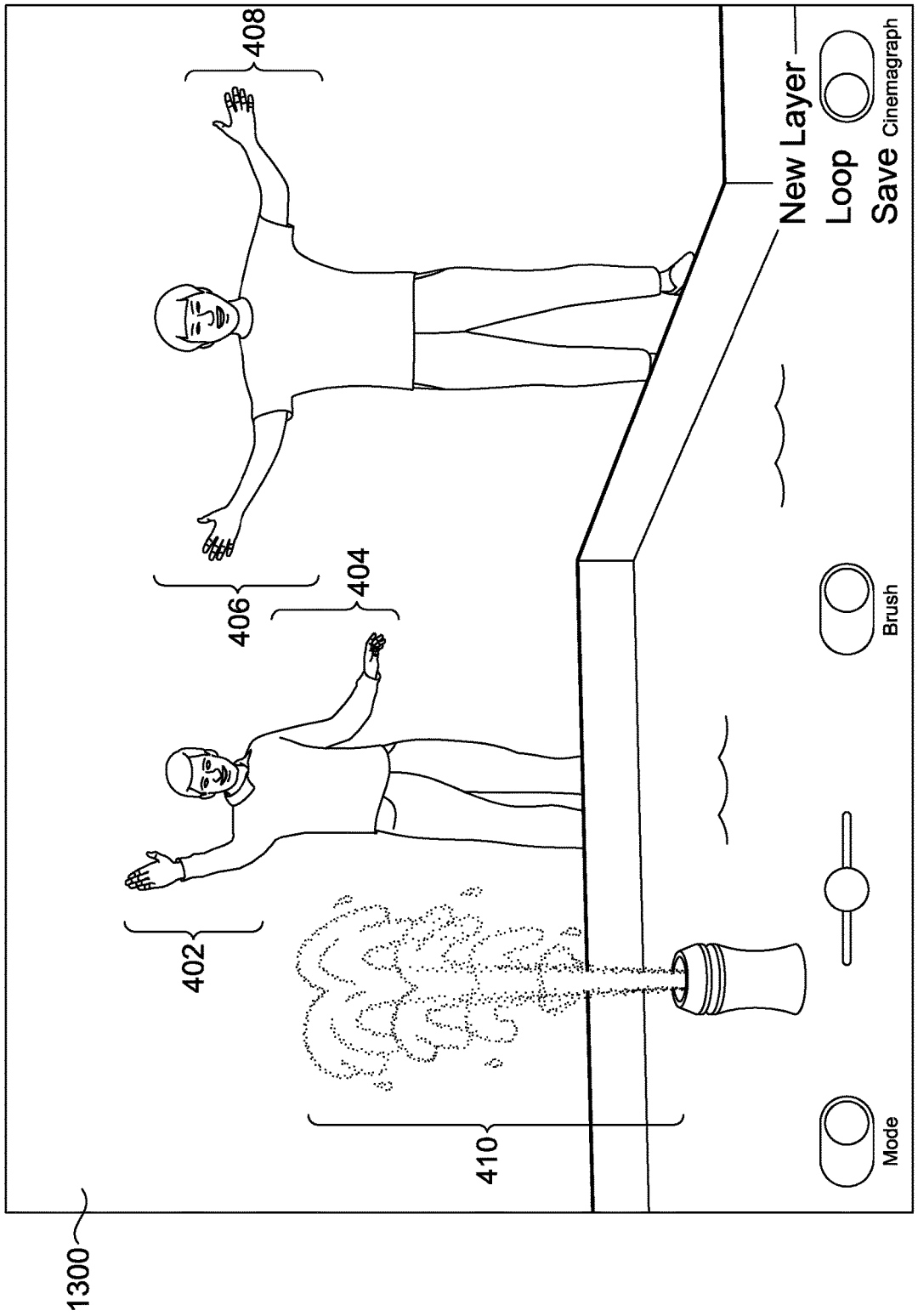

CREATING CINEMAGRAPHS WITH VIRTUAL LONG-EXPOSURE IMAGES

CROSS-REFERENCE TO RELATED APPLICATIONS

This application is related in subject matter to U.S. Nonprovisional application Ser. No. 15/895,695, entitled "Creating Selective Virtual Long-Exposure Images," filed Feb. 13, 2018, which is herein incorporated by reference in its entirety.

BACKGROUND

Long-exposure photographs and cinemagraphs both fuse still imagery with representations of motion. Long-exposure photography utilizes a long-duration shutter speed to achieve imagery with sharp representation of stationary regions and a blurred effect of moving regions, and traditionally, a tripod has been needed to keep the camera stationary for the long duration needed to achieve a long-exposure photograph. Virtual long-exposure techniques attempt to create the same visual effect through alignment and aggregation of a stack of images or frames from a video. Similarly, cinemagraphs are still photographs in which small and repeated movement occurs, forming a video clip, and have traditionally been created using a series of images or frames from a video. Conventional aggregation techniques, however, create images with all moving elements being captured as motion indiscriminately, either as a blurred region in virtual long-exposure images or through actual movement in cinemagraphs, and do not allow for combining the long-exposure and cinemagraph effects in a single image.

SUMMARY

Aspects of the present disclosure relate to creating cinemagraphs from virtual long-exposure images while providing a user control over which regions in the image will have the long-exposure effect and which regions appear animated. Generally, a virtual LE image is provided from a stack of frames. Through aggregation and alignment of the frames, the long-exposure effect is achieved in which all elements moving between frames appear blurry, providing a trailing movement appearance. A user can create a cinemagraph by selecting a region of pixels for which the long-exposure effect is removed and replaced with an animation from a set of frames. After a particular region is selected, a set of frames for the animated portion is identified from the plurality of frames forming the virtual LE image. In some aspects, the set of frames is identified by automatically detecting a sequence of frames for forming a loop based on movement captured within the selected region. The transparency of the virtual LE image is increased, and the virtual LE image is arranged to overlay the set of frames to reveal corresponding portions of the frames within the set in the selected region. Through this process, the set of frames and the virtual LE image are blended together to create a cinemagraph. Additionally, in some aspects, the user can select a region for replacing the long-exposure effect in the virtual LE image with a single frame to provide the appearance of a non-moving element. The transparency of the virtual LE image in the second selected region is increased, and the virtual LE image overlays the single frame. The single frame may be rendered on top of the set of frames for animation and, as such, the transparency of the single frame at the first selected region may be increased so that the set of frames arranged are visible through the single frame and the virtual LE image. Through this process, the user is able to control application of the long-exposure effect by removing the effect from regions in which the user would like to have an animation or have a still appearance.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 1 is a block diagram showing an example of an operating environment, in accordance with embodiments of the present invention;

FIG. 2 provides an exemplary long-exposure cinemagraph manager in accordance with embodiments of the present invention;

FIGS. 3A and 3B illustrate example frames aggregated to form a virtual LE image that may be provided in accordance with embodiments of the present disclosure;

FIGS. 7A-7D illustrates the cinemagraph from FIG. 6 presented on a graphic user interface in accordance with embodiments of the present disclosure;

FIGS. 9A and 9B illustrate example selective virtual LE images with different frames for the selected region in accordance with embodiments of the present disclosure;

FIGS. 13A-13D illustrates the cinemagraph from FIG. 12 presented on a graphic user interface in accordance with embodiments of the present disclosure;

DETAILED DESCRIPTION

Figure 4A:
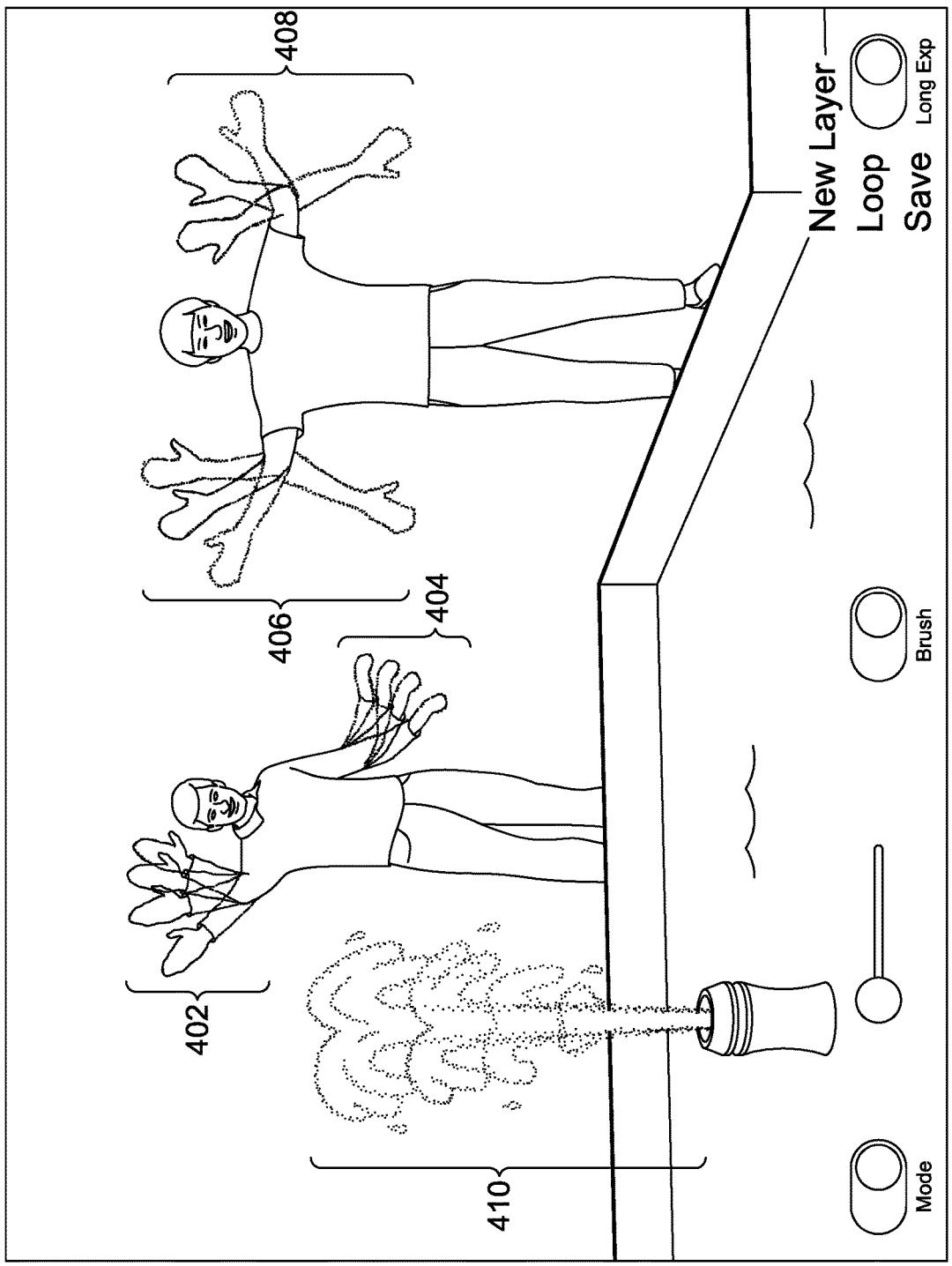
FIG. 4A illustrates an example virtual LE image provided on a user interface in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Long-exposure photographs and cinemagraphs both fuse still imagery with representations of motion. Long-exposure photography is a technique using a long-duration shutter speed to sharply capture stationary elements while blurring moving elements, creating appearance of a trail of movement. To achieve this long-exposure visual effect, the camera should remain stationary during the duration of the image capturing and, as such, is commonly used with a tripod. However, transporting and setting up a tripod can be cumbersome, while many people today prefer portable photography options, including using cameras provided on smartphone devices. As such, virtual long-exposure techniques have developed to create a long-exposure image without the need for a tripod. Rather than using a single image taken with a long-duration shutter speed, virtual long-exposure techniques utilize several short-exposure images, also referred to herein as short-exposure frames, that are taken in quick succession. Through alignment techniques and image aggregation, the stack of short-exposure (SE) frames form a virtual LE image with stationary elements being sharply represented and moving elements having a blurred appearance. While long-exposure photographs depict motion from the scene without actual movement in the resultant image, cinemagraphs are photographs in which most of the photograph appears "still" with other portions having small and repeated movement, forming a video clip. Similar to virtual LE images, cinemagraphs have traditionally been created using a series of images or frames from a video taken using a tripod.

However, with these techniques, the long-exposure effect (for virtual LE images) and animation (for cinemagraphs) are applied indiscriminately such that every moving element in the captured image results in either a blurry representation or animation. In this way, the photographer lacks control over which moving objects will be represented as movement in the resultant image or cinemagraph. Specifically, a user may desire certain moving elements to not be blurred or animated in the resultant cinemagraph. Additionally, the user may wish to create a more dynamic end product by using both the long-exposure effect and animation for portraying movement of different elements in the captured scene. Although some existing techniques for creating a cinemagraph involve the user masking out movement in certain frames, these techniques still require the use of a tripod and does not provide a mechanism for incorporating animations with the long-exposure effect.

Accordingly, embodiments of the present invention are directed to improving over these conventional techniques by facilitating selective application of animation for creating a cinemagraph from a virtual LE image. In this way, regions in a virtual LE image with the long-exposure effect (i.e., blurred or trailing appearance) may be visibly replaced with an animation or a single frame showing a stationary element or may be left to convey movement with the long-exposure effect. Generally, a virtual LE image is provided. As used herein, a virtual LE image is one or more digital images created from a stack, which refers to a plurality of aggregated and aligned frames. The virtual LE image may refer to a single image formed from flattening a stack of images or may refer to the stack of aligned images. As used herein, the frames may comprise a plurality of photographs taken in succession or may be still frames of a video sequence. The frames are also referred to herein as SE frames to indicate that these frames are taken with a shorter duration shutter speed than traditional long-exposure images and, thus, as used herein, SE frames may include images with either a normal or short duration shutter speed.

In this virtual LE image, the long-exposure effect is automatically applied to every moving element. To remove the long-exposure effect in areas in which the user desires to show movement through animation, rather than the long-exposure effect, a user selects a region of pixels on the virtual LE image. A set of frames is then identified for animation. The set of frames are at least a portion of the stack of frames used to create the virtual LE image. In some aspects, the set of frames is automatically detected based on the selected region. The automatically detected set of frames may depict movement within the selected region such that the set of frames may be used to form a loop. In some aspects, if a set of frames for a loop is not automatically detected, the set of frames may be identified through receipt of a selection of frames from the user.

To combine the virtual LE image and set of frames to form a cinemagraph, the transparency of the pixels within the selected region on the virtual LE image is automatically increased. The virtual LE image is arranged over the set of frames such that a portion of each frame within the set that corresponds to the selected region is visible through the virtual LE image. The result is a cinemagraph in which the selected region of pixels is replaced by an animation formed by the set of frames. The cinemagraph may also include one or more blurred, or long-exposure effect, portions from the virtual LE image that were not selected for replacement. Through this process, the user is able to advantageously control application of animation in creating cinemagraphs by selecting the particular portion for the animation and can combine animation with the long-exposure effect in the cinemagraph.

Further, the user may also be able to control application of the long-exposure effect by removing the long-exposure effect in regions in which the user does not want to convey movement either by animation or the long-exposure effect. This is done through creating a selective virtual LE image to be used for the cinemagraph by receiving a second user-selected region of pixels on the virtual LE image. The transparency level of the pixels within the selected region on the virtual LE image is automatically increased, and the virtual LE image is arranged over an individual frame from the stack of frames so that a portion of the individual frame is visible in place of the blurred element in the selected region of the virtual LE image. The resultant image, referred to herein as the selective virtual LE image, comprises at least a portion depicting the aggregation of frames, which may include the long-exposure effect to depict a moving element, and a portion depicting a stationary element from the individual frame. To combine the selective virtual LE image with the set of frames identified for animation, the transparency of the individual frame is also increased at a region corresponding to the first selected region of pixels, and the selective virtual LE image, which comprises both the original virtual LE image and the individual frame, is rendered on top of the set of frames identified for the animation. Through this process, the user is able to control application of animation and the long-exposure effect by removing the long-exposure effect in place of animation to depict movement in a different manner or in place of a single frame to depict the elements in that region as stationary.

Example Operating Environment

Turning now to FIG. 1, a block diagram is provided showing an example of an operating environment in which some implementations of the present disclosure may be employed. It should be understood that this environment and other arrangements described herein are set forth only as examples. Other arrangements and elements (e.g., machines, interfaces, functions, orders, and groupings of functions, etc.) can be used in addition to or instead of the specific arrangement and elements shown, and some elements may be omitted altogether for the sake of clarity. Further, many of the elements described herein are functional entities that may be implemented as discrete or distributed components or in conjunction with other components and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 illustrates an example implementation that is operable to employ techniques described herein. The illustrated environment 100 includes a computing device 110 having a processing system 112 that may include one or more processing devices (e.g., processors) and one or more computer-readable storage media 114. The illustrated environment 100 also includes image content 116 and a long-exposure cinemagraph manager 118 embodied on the computer-readable storage media 114 and operable via the processing system 112 to implement corresponding functionality described herein. In at least some implementations, the computing device 110 may include functionality to access various kinds of web-based resources (content and services), interact with online providers, and so forth as described in further detail below.

The computing device 110 may be configured as any suitable type of computing device. For example, the computing device 110 may be configured as a server, a desktop computer, a laptop computer, a mobile device (e.g., a handheld configuration), a tablet, a camera (point-and-shoot, single lens reflex (SLR), a video recorder, etc.), a device configured to receive speech input, a device configured to receive stylus-based input, a device configured to receive a combination of those inputs, and so forth. Thus, the computing device 110 may range from full resource devices with substantial memory and processor resources (e.g., servers, personal computers, game consoles) to a low-resource device with limited memory and/or processing resources (e.g., mobile devices). Additionally, although a single computing device 110 is shown, the computing device 110 may be representative of a plurality of different devices to perform operations "over the cloud."

The environment 100 further depicts one or more service providers 124, configured to communicate with computing device 110 over a network 120, such as the Internet, to provide a "cloud-based" computing environment. Generally, service providers 124 are configured to make various resources 122 available over the network 120 to clients. In some scenarios, users may sign up for accounts that are employed to access corresponding resources from a provider. The provider may authenticate credentials of a user (e.g., username and password) before granting access to an account and corresponding resources 122. Other resources 122 may be made freely available (e.g., without authentication or account-based accessed). The resources 122 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), etc.

These sources may serve as significant amounts of image content. Such image content may be formatted in any of a variety of image formats, including but not limited to JPEG, TIFF, RAW, GIF, BMP, PNG, etc. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The long-exposure cinemagraph manager 118 is generally configured to represent functionality to implement the creation of cinemagraphs from virtual LE images, which may be part of or created from image content 116. In particular, the long-exposure cinemagraph manager 118 can facilitate integration of a set of frames in a portion of a virtual LE image to replace the long-exposure effect with an animation in that portion.

When frames are aggregated to form a virtual LE image, the frames may be aligned based on similarly of background pixels at each pixel location. Using this alignment, pixels within the individual frames correspond to pixels in the aggregated virtual LE image. To create a cinemagraph, a user's selection of a region of pixels on the virtual LE image is received, and the corresponding pixels from a set of frames visually replace the selected pixels on the aggregated image such that a blurred appearance in that region is replaced by an animation. This replacement may be accomplished by, for example, increasing the transparency of the pixels selected from the virtual LE image and layering the virtual LE image on top of the set of frames so that the corresponding pixels in the frames within the set are visible through the transparent region of the virtual LE image. The resulting cinemagraph may be presented to a user through a user interface. When presented on the user interface, the set of frames may create the animation portion, visible through the transparent region of the virtual LE image. The cinemagraph may be saved as a video or animation file.

The long-exposure cinemagraph manager 118 may further be configured to create a selective virtual LE image to use in creating the cinemagraph. The selective virtual LE image may be created by replacing a different selected region of the virtual LE image with a single frame (rather than a set of frames). The transparency of the virtual LE image in the different selected region may be increased, and the virtual LE image may be rendered over the single frame such that a blurred portion on the virtual LE image is visibly replaced by the single frame. The selective virtual LE image may then be used with the set of frames to create a cinemagraph in which at least one blurred portion is replaced by an animation and at least one blurred portion is replaced with a stationary element from the single frame. When combined, the selective virtual LE, which comprises the original virtual LE overlaying the individual frame, is rendered on top of the set of frames. Accordingly, in addition to increasing transparency of the virtual LE image at the region selected for animation, the transparency of the individual frame is also increased such that the set of frames may be visible through both the virtual LE image and the individual frame.

The long-exposure cinemagraph manager 118, or aspects or components associated therewith, may be implemented as software modules, hardware devices, or using a combination of software, hardware, firmware, fixed logic circuitry, etc. Further, the long-exposure cinemagraph manager 118, or components associated therewith, may be implemented as a standalone component of the computing device 110 as illustrated. Additionally or alternatively, the long-exposure cinemagraph manager 118 may be configured as components of web services, applications, an operating system of the computing device 110, plug-in modules, or other device applications.

Turning now to FIG. 2, an exemplary long-exposure cinemagraph manager 210 (which may represent manager 118 of FIG. 1) is provided in accordance with embodiments of the present invention. The long-exposure cinemagraph manager 210 is illustrated with a virtual LE image component 212, a region selection component 214, a frame set identification component 216, an image combining component 218, a selective virtual LE image component 220, and a data store 222. These components represent functionality of the long-exposure cinemagraph manager 210, and it should be appreciated that such functionality may be implemented using more or fewer components than those illustrated.

The long-exposure cinemagraph manager 210, and/or components associated therewith, can access data store 222. Data store 222 can store any type of data used in association with creation of cinemagraphs over long-exposure. By way of example only, data store 222 may include SE frames, virtual LE images, selections of regions for removal of the long-exposure effect, sets of frames for animation, cinemagraphs, selective virtual LE image options, saved selective virtual LE images, image sizes, image dimensions, image alignment information, and/or the like. Such data may be provided to or referenced by the long-exposure cinemagraph manager 210, or components thereof. Further, the long-exposure cinemagraph manager 210, or components thereof, may provide such data to the data store 222 for subsequent use.

At a high level, the long-exposure cinemagraph manager 210 is configured to facilitate creating cinemagraphs from virtual LE images where a long-exposure effect resulting from aggregating frames in the virtual LE image is replaced with an animated set of frames. Generally, the virtual LE image component 212 is configured to provide a previously created virtual LE image or to create a virtual LE image through aggregation and alignment of a plurality of frames. The region selection component 214 is configured to receive a user's selection of a region of pixels on the virtual LE image, which may include undesirable blurred appearance caused by moving elements. The frame set identification component 216 is configured to identify a set of frames within the frames forming the virtual LE image for which an animation may be created. The image combining component 218 is configured to automatically combine the virtual LE image with the set of frames such that a portion of the frames with the set of frames visibly replaces the selected region of the virtual LE image. The selective virtual LE image component 220 is configured to create a selective virtual LE image having one or more of the blurred regions in the original virtual LE image that are visibly replaced with a single frame to create the appearance of a stationary element, as described in more detail below.

As mentioned, the virtual LE image providing component 212 is configured to provide a virtual LE image. The virtual LE image is formed from a stack of successive frames that are aligned based on similarity of pixels. The virtual LE image may be in the form of a stack of separate frames or may be in the form of a single image created after flattening the stack of frames. Through the alignment and aggregation, movement of elements captured through the successive frames are depicted in the aggregated form (i.e., the virtual LE image) as having a blurred effect. Turning to FIG. 3A, frames 302, 304, and 306 are example SE frames taken in succession that capture a person waving his arms. These frames may have been taken individually by a user or as successive frames through an automated camera function, such as a photograph burst mode, or may be still frames extracted from a video file. FIG. 3B illustrates frames 302, 304, and 306 aligned and aggregated to create a stack 310. In exemplary aspects, the alignment of frames is based on similarity of background pixels at each pixel location over the aligned stack. The stack 310 includes blurred portions 312 and 314 resulting from the change in position of the person's arms between frames 302, 304, and 306.

Returning to FIG. 2, the virtual LE image component 212 may provide the virtual LE image by creating the virtual LE image through aggregation and alignment techniques. Alternatively, the virtual LE image may be provided through receipt of virtual LE image generated by a separate component. In some instances, the virtual LE image is provided as a layered image, with each layer being an individual frame, while in other embodiments, the virtual LE image is flattened such that the individual frames are merged into a single layer. In embodiments in which the virtual LE image is received as a single layer from a separate component, at least some of the individual frames forming the virtual LE image are also provided.

The region selection component 214 is configured to receive a user's selection of a region of pixels within the virtual LE image, which may include an undesirable blurred appearance caused by moving elements. As previously explained, a virtual LE image may have the blurred appearance for all the moving elements when the user may not have wanted to capture all of the motion with the long-exposure effect. FIG. 4A, for example, depicts an example virtual LE image 400 as displayed on a user interface, and the virtual LE image 400 has five regions of motion: regions 402 and 404 representing a first person's moving arms, regions 406 and 408 representing a second person's moving arms, and region 410 representing moving water in a water fountain. Each of regions 402, 404, 406, 408, and 410 have a blurred appearance.

Figure 4B:
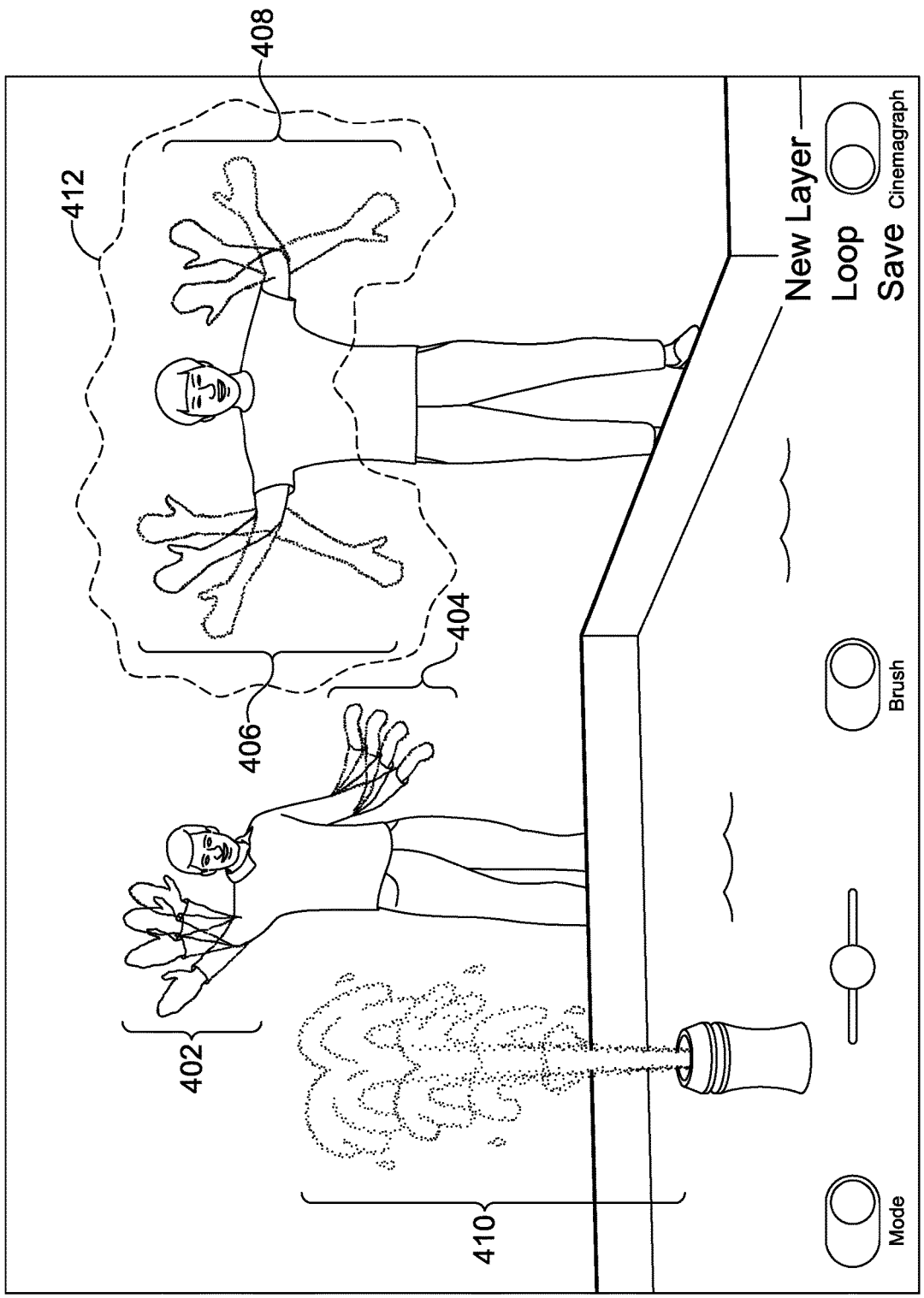
FIG. 4B illustrates a region of the example virtual LE image of FIG. 4A selected for removal of the long-exposure effect in accordance with embodiments of the present disclosure.
Figure 5A:
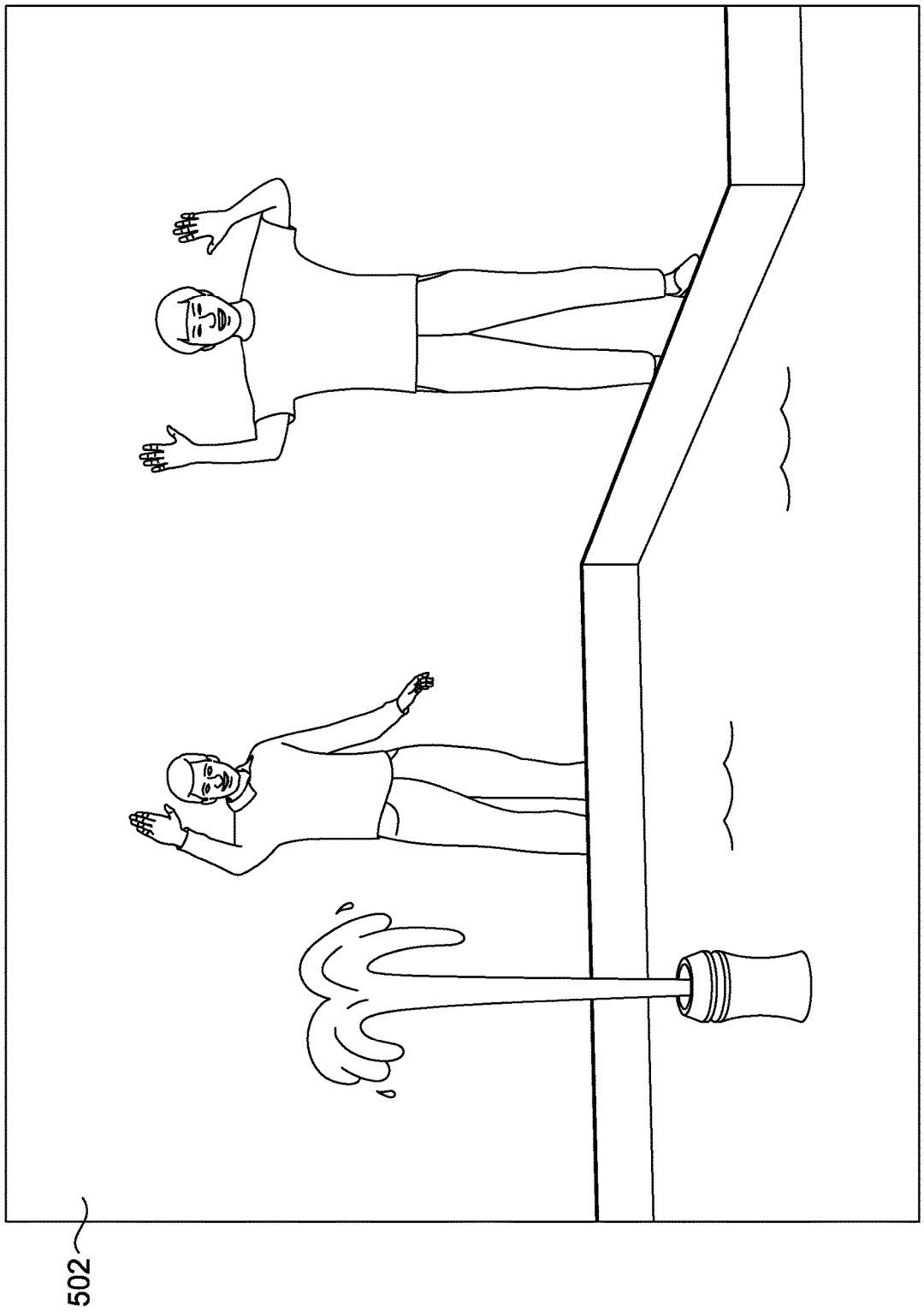
FIGS. 5A-5D illustrate a set of frames identified for animation in accordance with embodiments of the present disclosure.
Figure 5B:
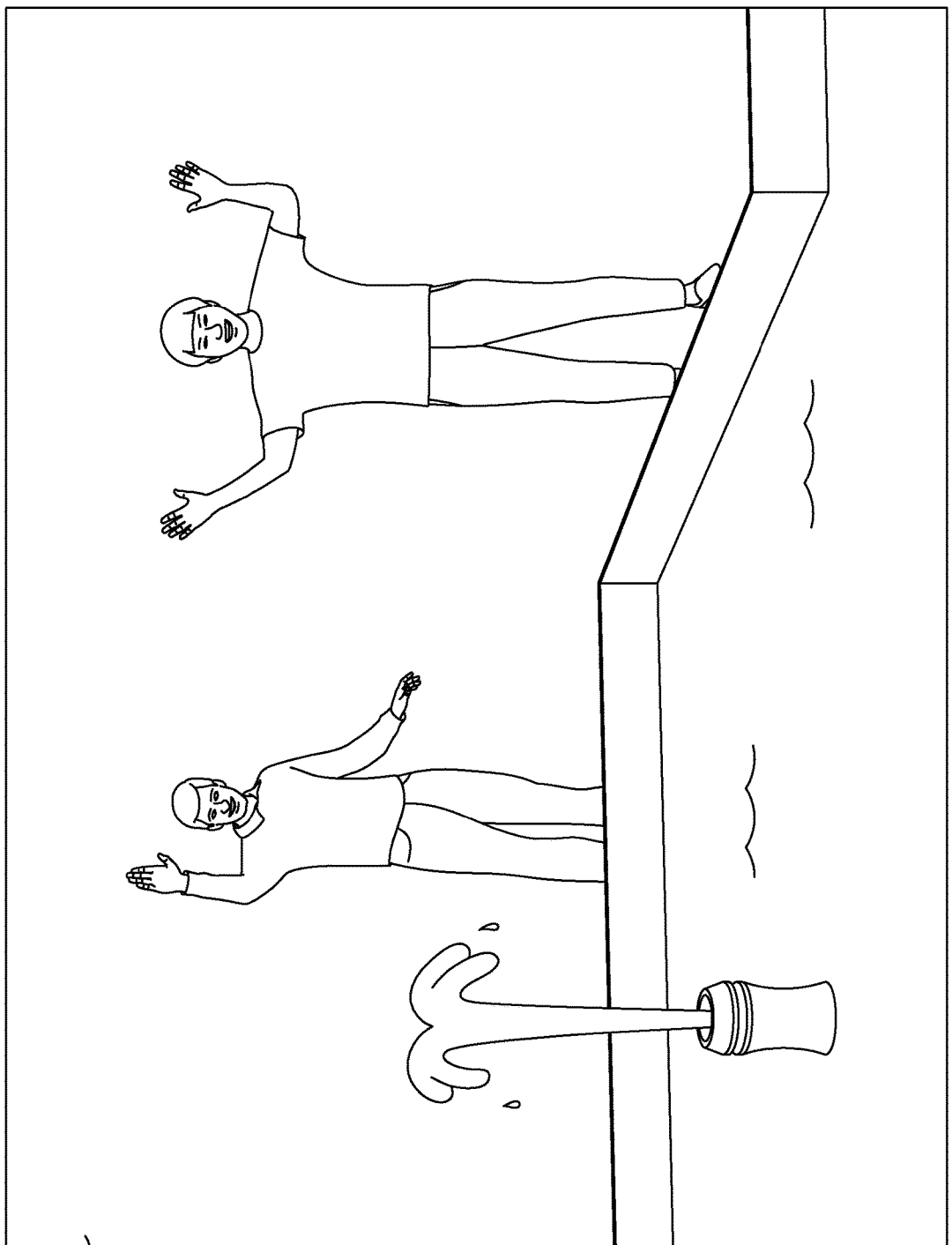
Figure 5C:
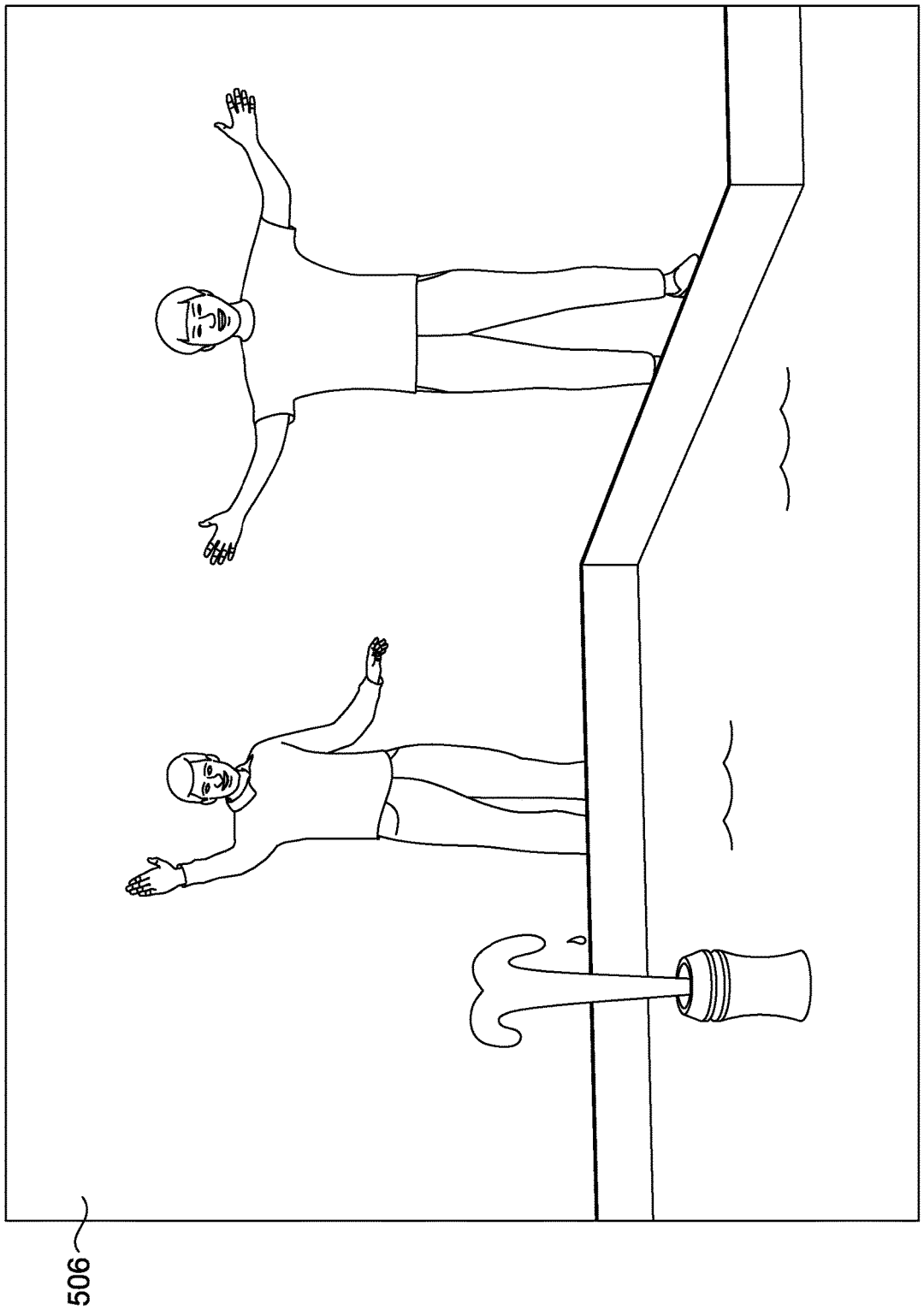
Figure 5D:
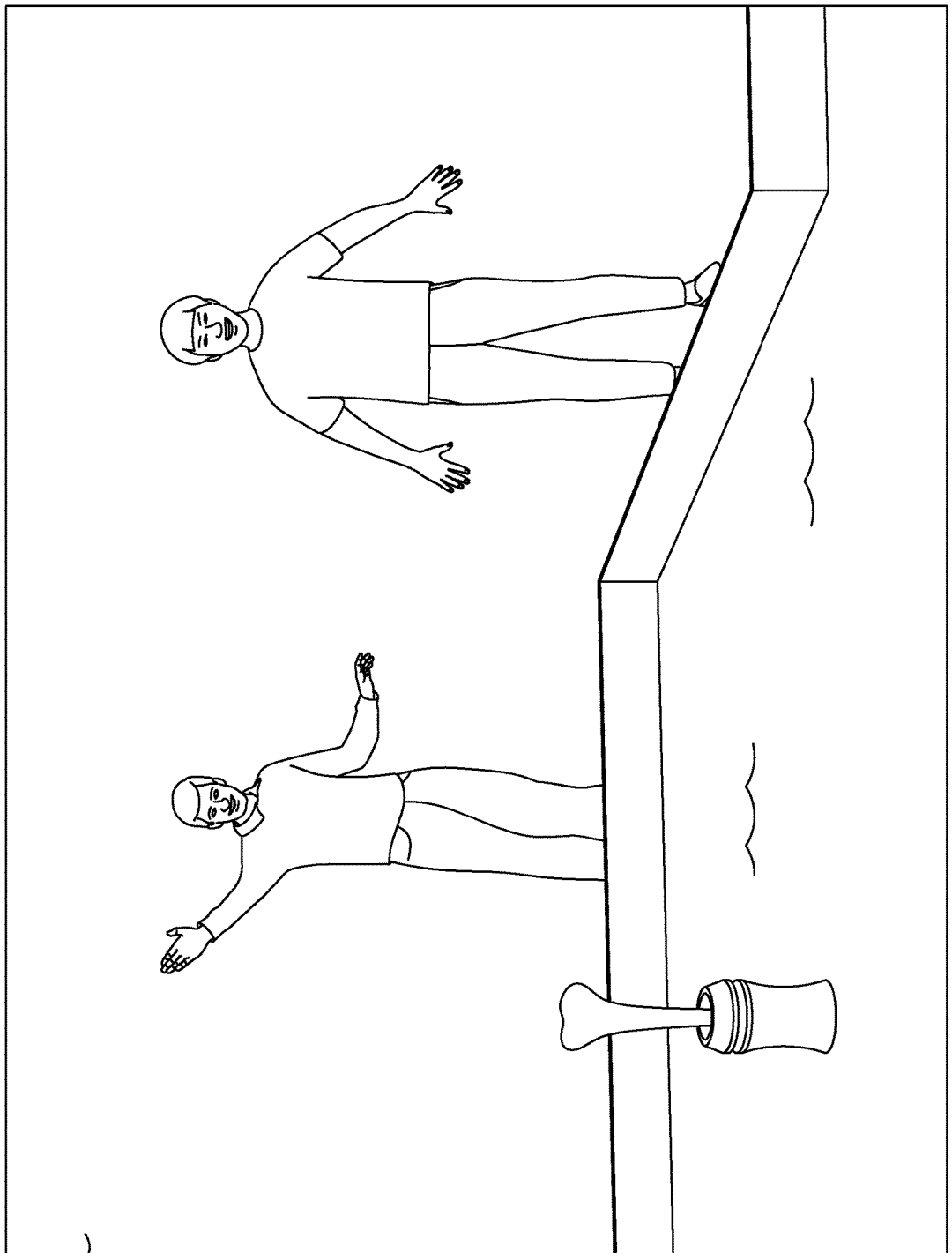

A user may desire for movement within one or more of the blurred regions to be depicted through an animation rather than the long-exposure effect. Accordingly, a user may select a region of pixels for removal of the long-exposure effect. The selection may be received through one or more input devices, such as a cursor control device, including a mouse, a touch pad, a button, a stylus on a tablet, a track ball, or another suitable input device or may be received through touch input received from a touchscreen of a user device through a stylus, finger, or other instrument. In some embodiments, the size and shape of the region selected is determined by the user, providing increased control and flexibility to the user. For example, the user may use a mouse to outline a region for selection or brush the user's finger over a region on a touchscreen. FIG. 4B depicts the virtual LE image 400 with a user selected region 412 over a portion of the image 400. The user-selected region 412 encompasses blurred regions 406 and 408. The user-selected region may be marked with a visual indicator. For instance, in FIG. 4B, region 412 is outlined with a dashed line, but it is contemplated that other visual indicators may be used. In exemplary embodiments, for example, the user-selected region 412 is presented as a different color than the rest of the virtual LE image 400. In addition to or alternatively, the user-selected region 412 may be presented as having a different opacity or brightness. As depicted in FIG. 4B, the region 412 selected by the user may comprise a single, continuous grouping of pixels. In some embodiments, a user can select multiple distinct groupings of pixels separated from each other by non-blurred regions. For example, the selected region 412 in FIG. 4B could encompass blurred regions 406 and 408 but not include the non-blurred region of pixels depicting the person's head and torso.

Returning to FIG. 2, once a selection of a region of pixels is received, the frame set identification component 216 is configured to identify a set of frames for animation within the region of pixels. The set of frames is a plurality of frames selected from the frames in the stack of frames forming the virtual LE image. The set of frames identified may be a portion of the frames in the stack such that some of the frames used to create the virtual LE image are not part of the set of frames identified for animation. But it is also the set of frames identified that may comprise all of the frames forming the virtual LE image.

In exemplary aspects, the set of frames is automatically detected based on the region of pixels. Specifically, based on movement between frames within the selected region, a sequence of frames may be automatically identified as capable of forming a loop. A loop comprises a sequence of frames that is repeated such there is a smooth transition between the last and the first frames within the sequence. Because the set of frames is automatically detected based on the movement within the selected region, a different set of frames may be identified for animation if a different region, such as one including blurred regions 402 and 404, are selected. FIGS. 5A-5D illustrate a set of frames 502, 504, 506, and 508 comprising four frames arranged in sequential order. In the sequence, the person on the right, who is part of selected region 412 in FIG. 4B, is moving his hands in different positions. In a loop, the frames would be presented in order of frame 502, frame 504, frame 506, and frame 508, and after frame 508, the sequence would repeat, starting again with frame 502. The loop may be presented as an infinite loop.

The set of frames may also be identified as capable of forming a bounce instead of a loop. For a bounce, the order in which the sequence is presented is reversed each time the sequence ends. For instance, the frames would be presented in order of frame 502, frame 504, frame 506, and frame 508, and after frame 508, the sequence would return to the first frame in reverse order (i.e., frame 506, then frame 504, then frame 502). In some aspects, a set of frames is identified for a bounce where a smooth transition between the end of a sequence and the beginning of a sequence cannot be made.

The frame set may also be identified manually by a user. As such, the frame set identification component 216 identifies the frame by receiving a selection of a range of frames to use for the animation. In some embodiments, the frame set identification component 216 first attempts to identify the set of frames through automatic detection and provides a mechanism for the user to manually enter the desired frame set if no set is automatically identified. In other embodiments, an option for manual identification by the user is always available.

After the frame set is identified, the image combining component 218 is configured to automatically combine the virtual LE image with the set of frames such that a portion of each frame within the set visibly replaces the selected region of the virtual LE image. In exemplary embodiments, this process is performed by increasing the transparency of the virtual LE image in the selected region and overlaying the virtual LE image on the set of frames such that pixels from the frames corresponding to the selected region are visible with the unselected portion of the virtual LE image. The virtual LE image may have a number of color channels and an alpha channel controlling the transparency level. As such, increasing the transparency level may be done by adjusting the alpha channel. Overlaying the virtual LE image on the set of frames may comprise rendering the set of frames and rendering the virtual LE image with the translucent region on top of the set. The set of frames may be rendered as an animation file format. Overlaying the virtual LE image and the set of frames and adjusting the transparency is also referred to herein as alpha blending.

Additionally, in some aspects, a smoothing process is automatically performed over the selected region of the virtual LE image after the region selection is received. Specifically, a Gaussian smoothing may be performed for the selected region with a kernel size d specifying size of a brush and sigma σ specifying a hardness of the brush, but it is contemplated that alternative smoothing techniques may be applied to remove noise.

Figure 6:
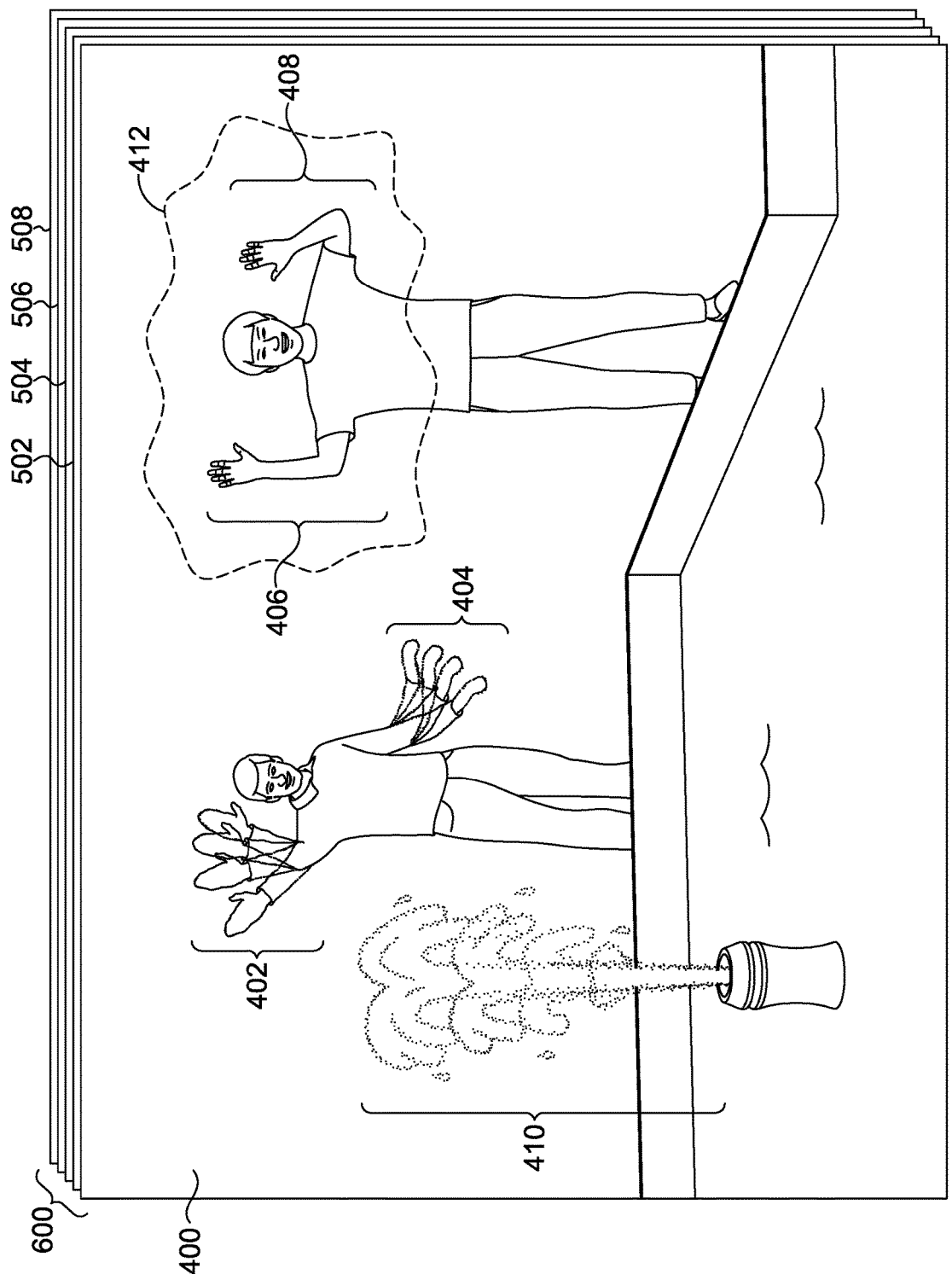
FIG. 6 illustrates a virtual LE image overlaying a set of frames for animation to create a cinemagraph in accordance with embodiments of the present disclosure.
Figure 7A:
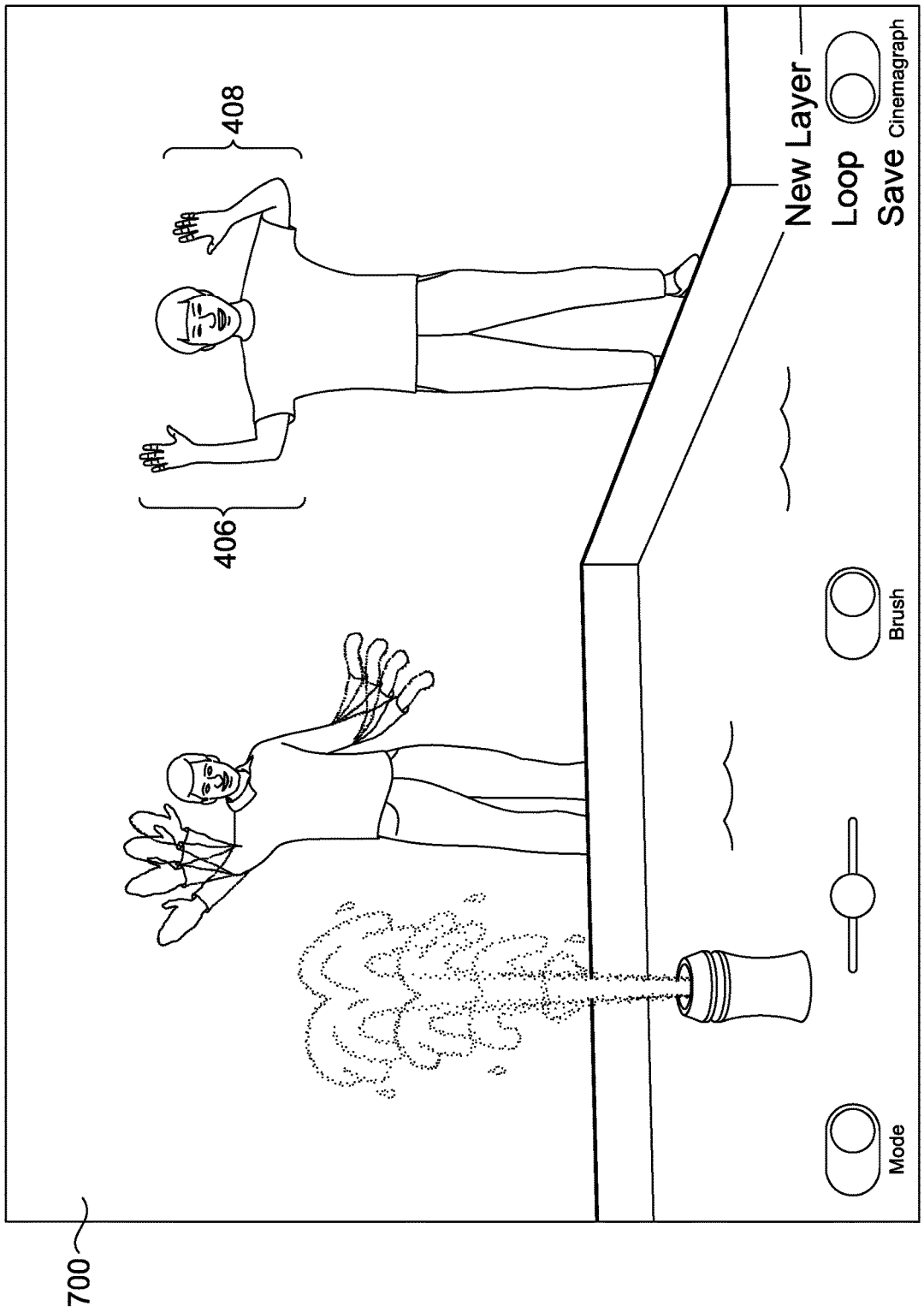
Figure 7D:
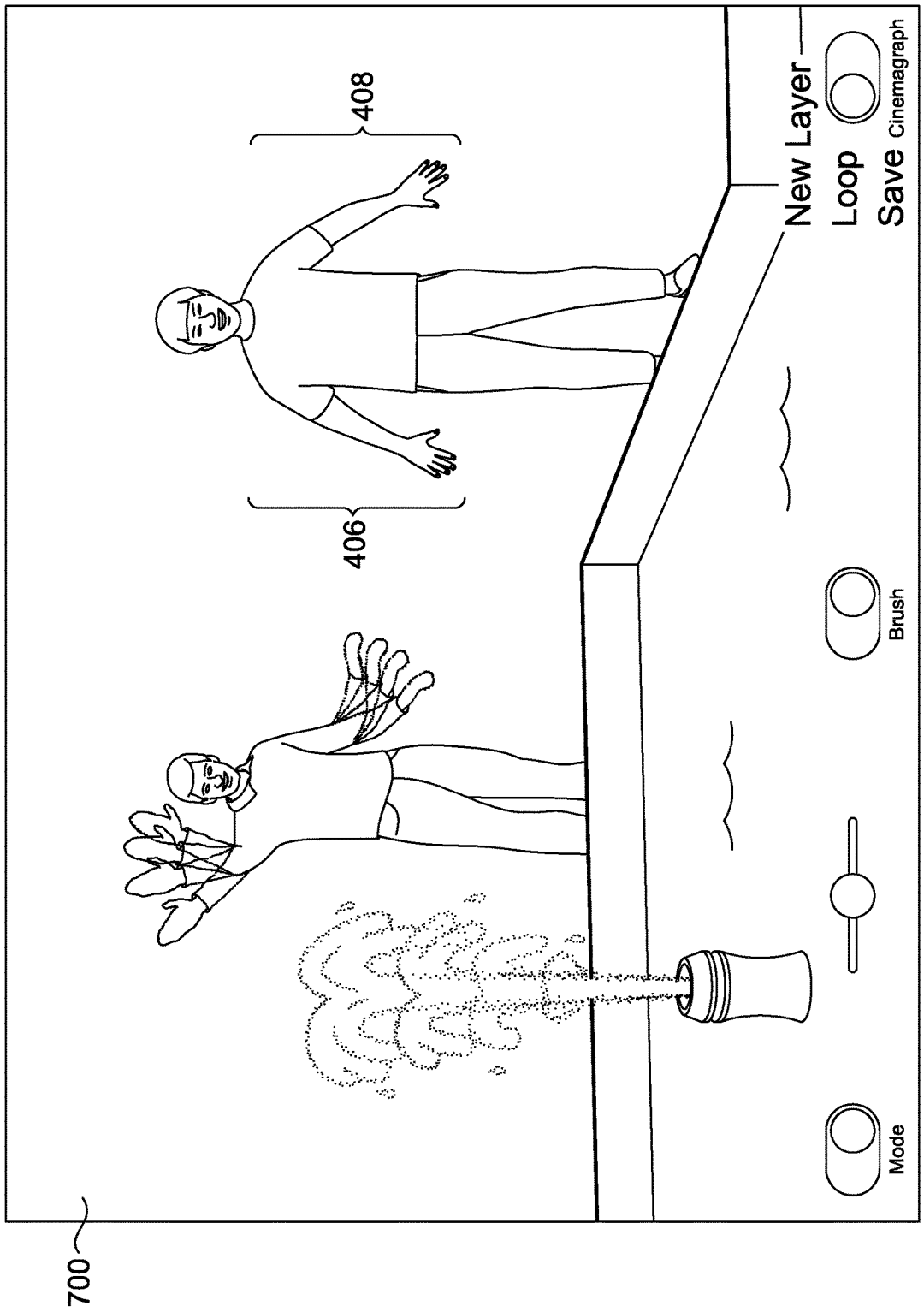

FIG. 6 depicts the virtual LE image 400 overlaying a set of frames 600 comprising frames 502, 504, 506, and 508 from FIGS. 5A-D. A portion of each from within the set is visible through the virtual LE image 400 at the selected region 412. The person's arms in areas 406 and 408, which were illustrated as blurry in the original virtual LE image 400, are now shown in a sharper representation, while the long-exposure effect is still maintained in other areas, including the second person's arms in regions 402 and 404 and the water fountain in region 410. In FIG. 6, the selected region 412 is indicated with the dashed outline; however, it is contemplated that, in some embodiments, when the combined images are presented to the user, there may not be a visual indicator of the selected region 412 such that there appears to be a seamless transition between the set of frames 600 and the virtual LE image 400 as shown in FIGS. 7A-7D.

In FIG. 6, the virtual LE image 400 is overlaying the set of frames 600, with the first frame 502 being directly under the virtual LE image 400. As such, the person's arms in region 412 are positioned as they are captured in the first frame 502. When rendered with the virtual LE image 400, however, the set of frames 600 are provided in an animation or video file format, such as GIF, APNG, MNG, MOV, MP4, AVI, FLV, WMV, and the like. Accordingly, the position of the person's arms in regions 406 and 408 (encompassed by user-selected region 412) will change based on other frames in the set of frames 600 to create an animated portion. For example, FIGS. 7A, 7B, 7C, and 7D depict a cinemagraph 700 formed by the virtual LE image 400 and the set of frames 600, as shown in FIG. 6, at different times in the sequence of the set of frames 600.

Cinemagraphs with Selective Virtual LE Images

As illustrated through FIGS. 7A-7D, a cinemagraph may be created from a virtual LE image such that a blurred portion of the virtual LE image is visibly replaced with an animation from a set of frames. The virtual LE image may also include the long-exposure effect in a region in which the user would like to have a sharper and non-animated portion to create the appearance of stationary elements. Accordingly, in exemplary aspects, the cinemagraph may be created to comprise, in addition to an animated portion, a non-blurred portion based on a single frame that visibly replaces another blurred portion of the virtual LE image. Replacing a blurred portion with a non-blurred, non-animated portion is done by creating a selective virtual LE image, and, as mentioned above, the selective virtual LE image component 220 of the long-exposure cinemagraph manager 210 is configured to create the selective virtual LE image.

Figure 8:
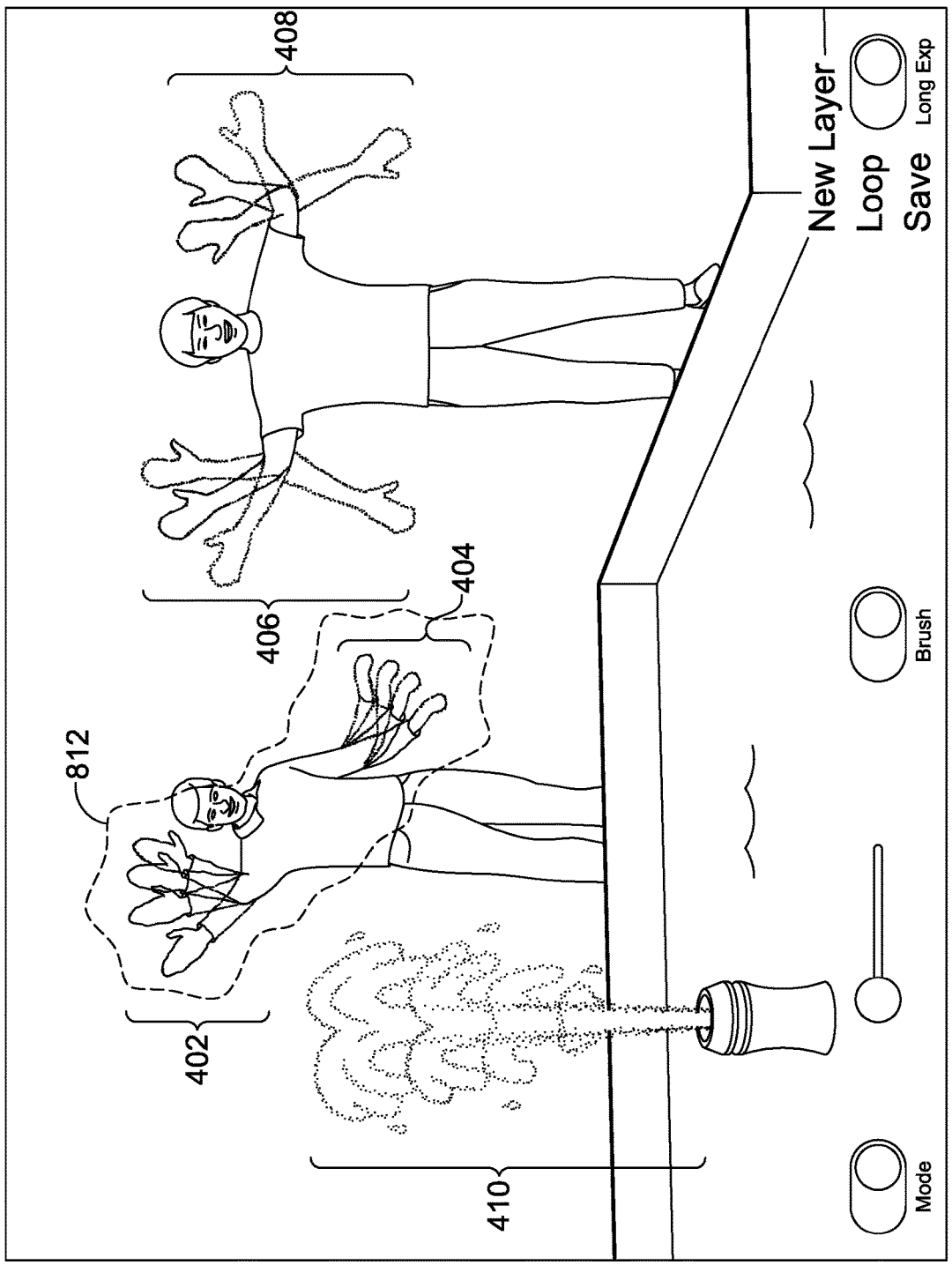
FIG. 8 illustrates a region of the example virtual LE image of FIG. 4A selected for removal of the long-exposure effect in accordance with embodiments of the present disclosure.

The selective virtual LE image component 220 receives a user's selection of a region of pixels within the virtual LE image, which may include an undesirable blurred appearance caused by moving elements. FIG. 8 depicts this new region 812 selected from the original virtual LE image 400 from FIG. 4A. This region of pixels is a different region than the region selected for animation, such as region 412. For instance, region 412 selected for animation in FIG. 4B encompasses blurred regions 406 and 408; whereas, region of pixels 812 encompasses blurred regions 402 and 404. The selection of region 812 may be done in a similar manner as described above with respect to selected region 412.

Once a selection of a region of pixels is received, the selective virtual LE image component 220 is configured to automatically combine the virtual LE image with an individual frame such that a portion of the individual frame visibly replaces the selected region of the virtual LE image. In exemplary embodiments, this process is performed by increasing the transparency of the virtual LE image in the selected region and overlaying the virtual LE image on an individual frame such that pixels from the individual frame corresponding to the selected region are visible with the unselected portion of the virtual LE image. As described above with respect to creating the cinemagraph, increasing the transparency level may be done by adjusting the alpha channel. Overlaying the virtual LE image on the individual frame may comprise rendering the individual frame and rendering the virtual LE image with the translucent region on top of the individual frame. Additionally, in some aspects, a smoothing process, such as Gaussian smoothing, is automatically performed over the selected region of the virtual LE image after the region selection is received.

FIG. 9A depicts a selective virtual LE image 900 comprising the virtual LE image 400 overlaying a first individual frame 902. The first individual frame 902 shows the person's arms in the selected region 812 (which includes blurred regions 402 and 404) in a first position. Because the pixels visible in selected region 812 is from individual frame 902 rather than the virtual LE image 400, the first person's arms have a sharper representation to appear stationary. But other areas of the selective virtual LE image 900, including the water fountain in region 410, still have a blurred appearance due to the aggregation of multiple frames in the original virtual LE image 400 forming those regions.

Because only a single frame is used from the plurality of frames forming the virtual LE image, a user can choose from multiple frame options for the selective virtual LE image. Thus, the selective virtual LE image component 220 may combine the virtual LE image with multiple individual frames to create different selective virtual long-exposure options. For instance, if virtual LE image 400 comprises a stack of four frames, the virtual LE image 400 may be combined with any individual frame out of those four frames. As mentioned, FIG. 9A shows the virtual LE image 400 overlaying a first frame 902, but turning to FIG. 9B, a different selective virtual LE image 910 is provided with the virtual LE image 400 overlaying a second frame 912. The virtual LE image 400 may be similarly combined with the third individual frame or the fourth individual frame. Each combination may be provided to the user as an optional selective virtual LE image, and the user may select the final selective virtual LE image based on the desired position of the moving element (the first person's arms) in the individual frame.

Figure 10A:
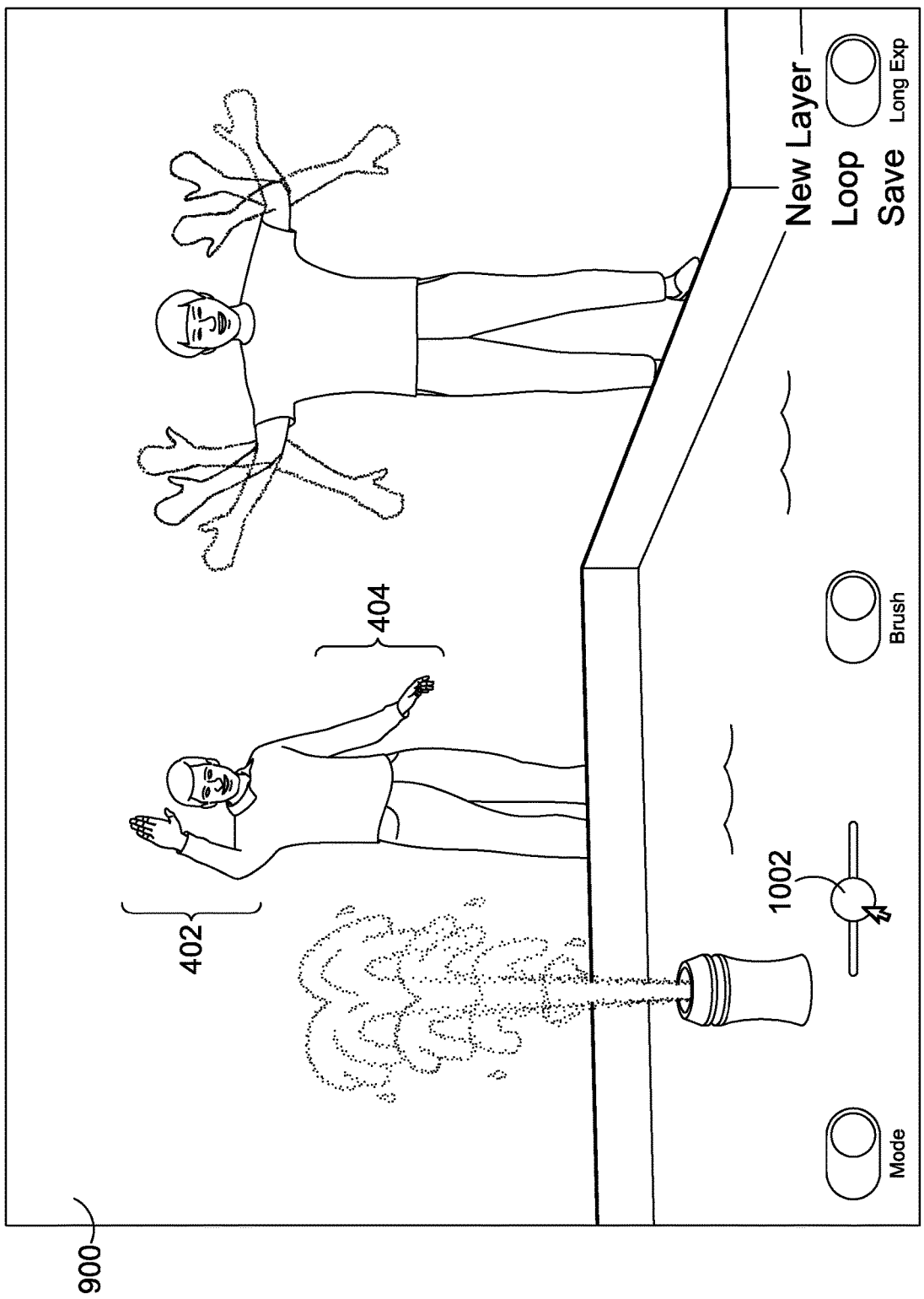
FIGS. 10A and 10B illustrate the example selective virtual LE images from FIGS. 9A and 9B, respectively, as presented on a user interface in accordance with embodiments of the present disclosure.
Figure 10B:
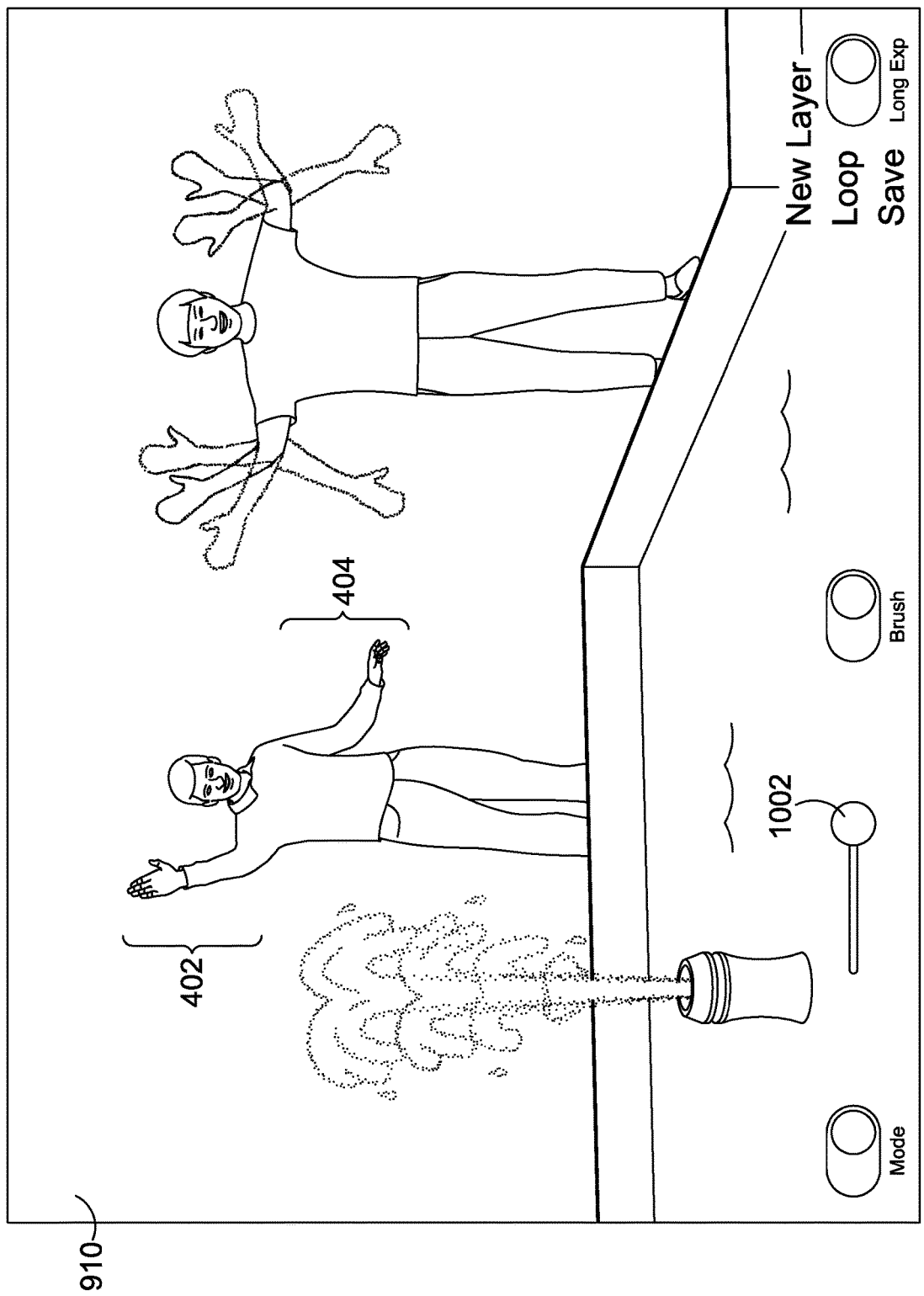

In some aspects, the different options for the selective virtual LE image based on the different frames may be presented individually on the graphic user interface, and the user can scroll through the different options using a slider. FIGS. 10A and 10B illustrate the selective virtual LE image options 900 and 910 created using frames 902 and 912, respectively, on an example graphic user interface in accordance with embodiments of the disclosure. Both selective virtual LE images 900 and 910 are presented with a slider object 1002 on the user interface. The position of the slider object 1002 corresponds to a particular frame, and, as such, movement of the slider object 1002 changes the particular frame being combined with the virtual LE image 400 and presented for display. As illustrated through FIGS. 10A and 10B, a user may move the slider object 1002 to view the different options for the selective virtual LE image, such as selective virtual LE images 900 and 910. In some embodiments, adjustment of the slider object 1002 changes the particular frame while the virtual LE image 400 overlaying the frame stays. Accordingly, the virtual LE image 400 and the individual frame, such as frame 902 or frame 912, are blended together each time an option is displayed. It is also contemplated that the options for the selective virtual LE image are presented in other manners, such as displaying a plurality of selective virtual-long exposure images with the different individual frames all together. Additionally, the individual frames may be presented without the overlaying virtual LE image, and a particular frame may be combined with the virtual LE image after the user selects the frame. This process may be used to replace other regions of the virtual LE image 400 with non-blurred, non-animated portions from individual frames.

Figure 11:
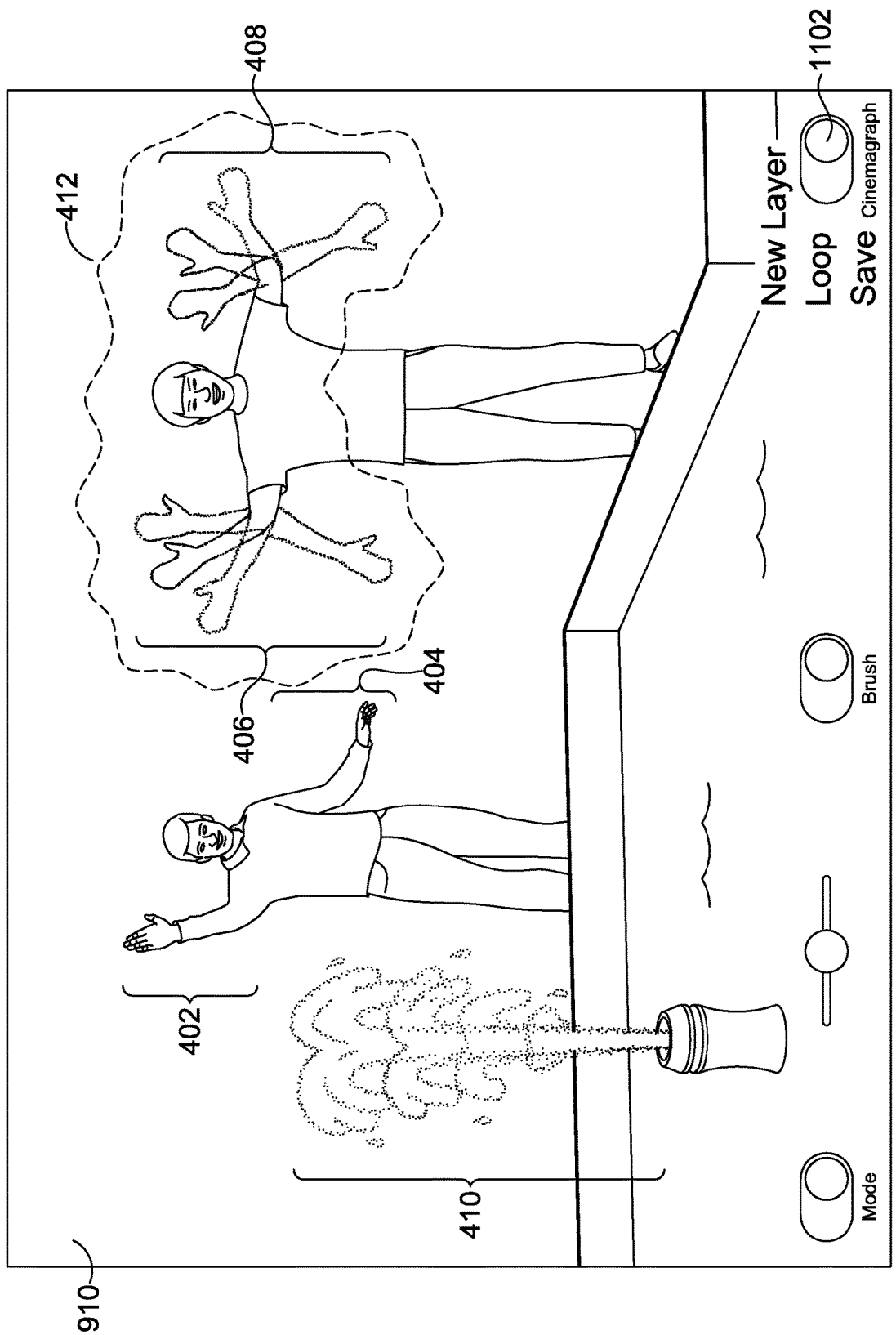
FIG. 11 illustrates a second region of the example virtual LE image of FIG. 4A being selected for removal of the long-exposure effect in accordance with embodiments of the present disclosure.
Figure 12:
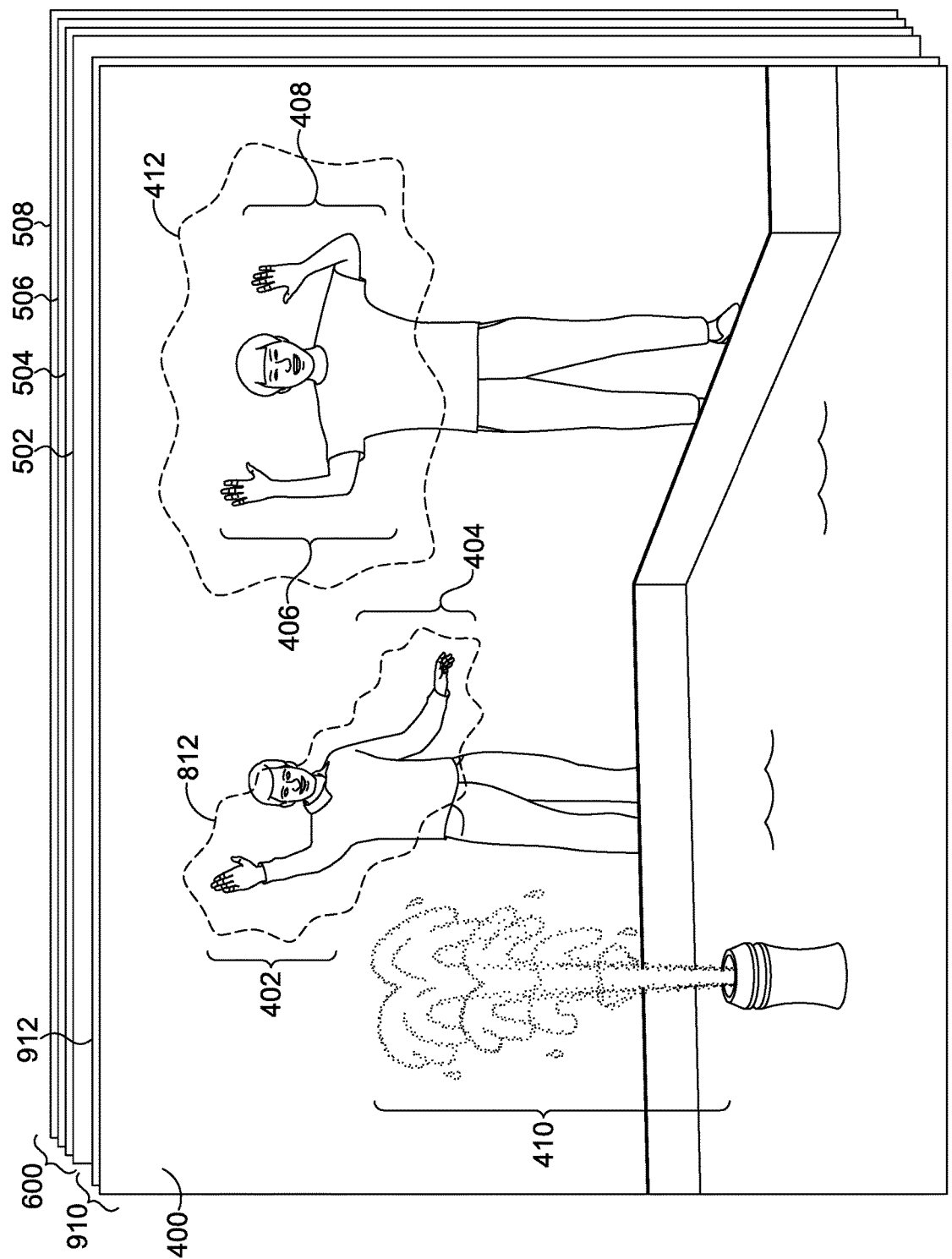
FIG. 12 illustrates the selective virtual LE image of FIG. 9B overlaying a set of frames for animation to create a cinemagraph in accordance with embodiments of the present disclosure.
Figure 13A:
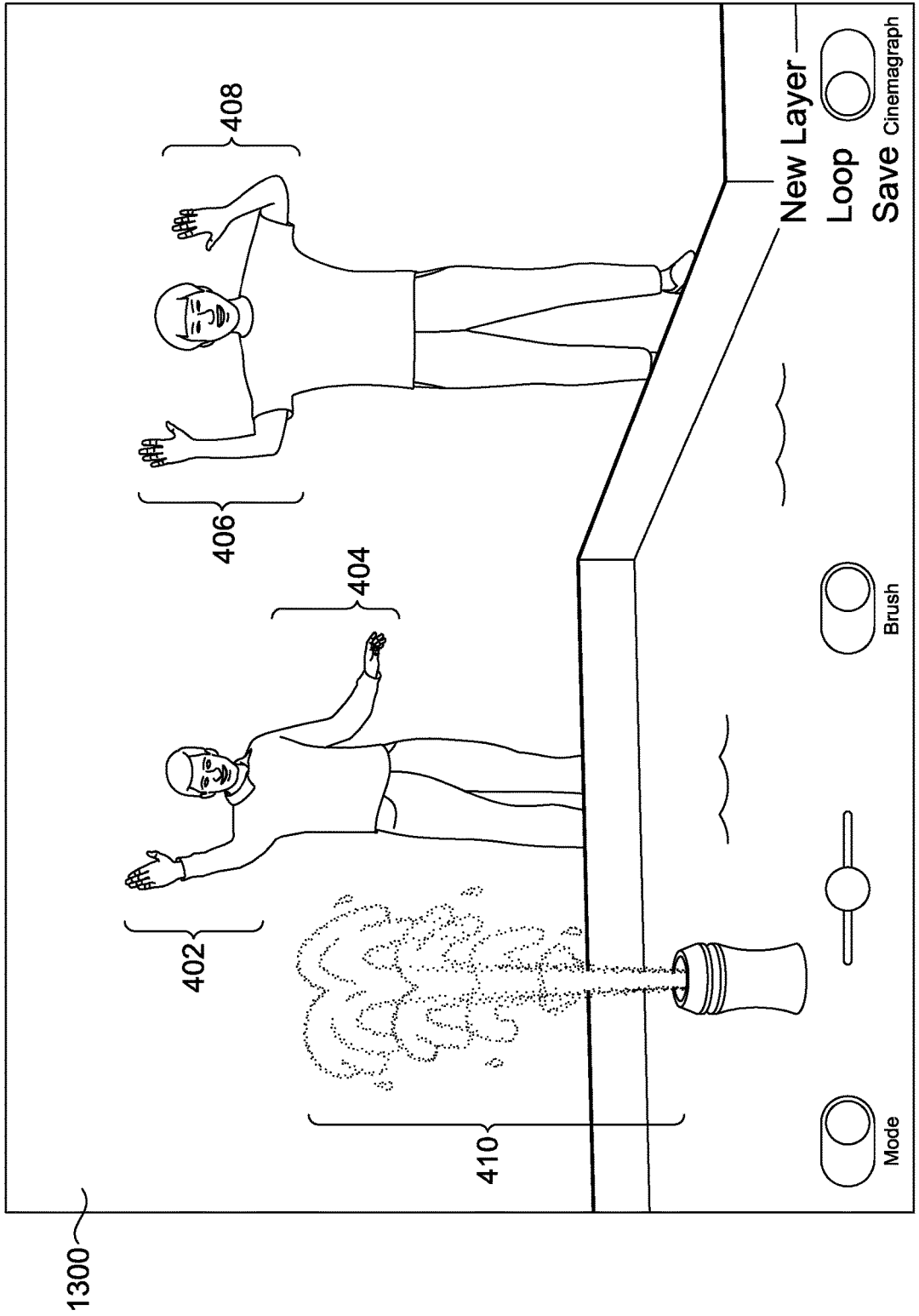
Figure 13B:
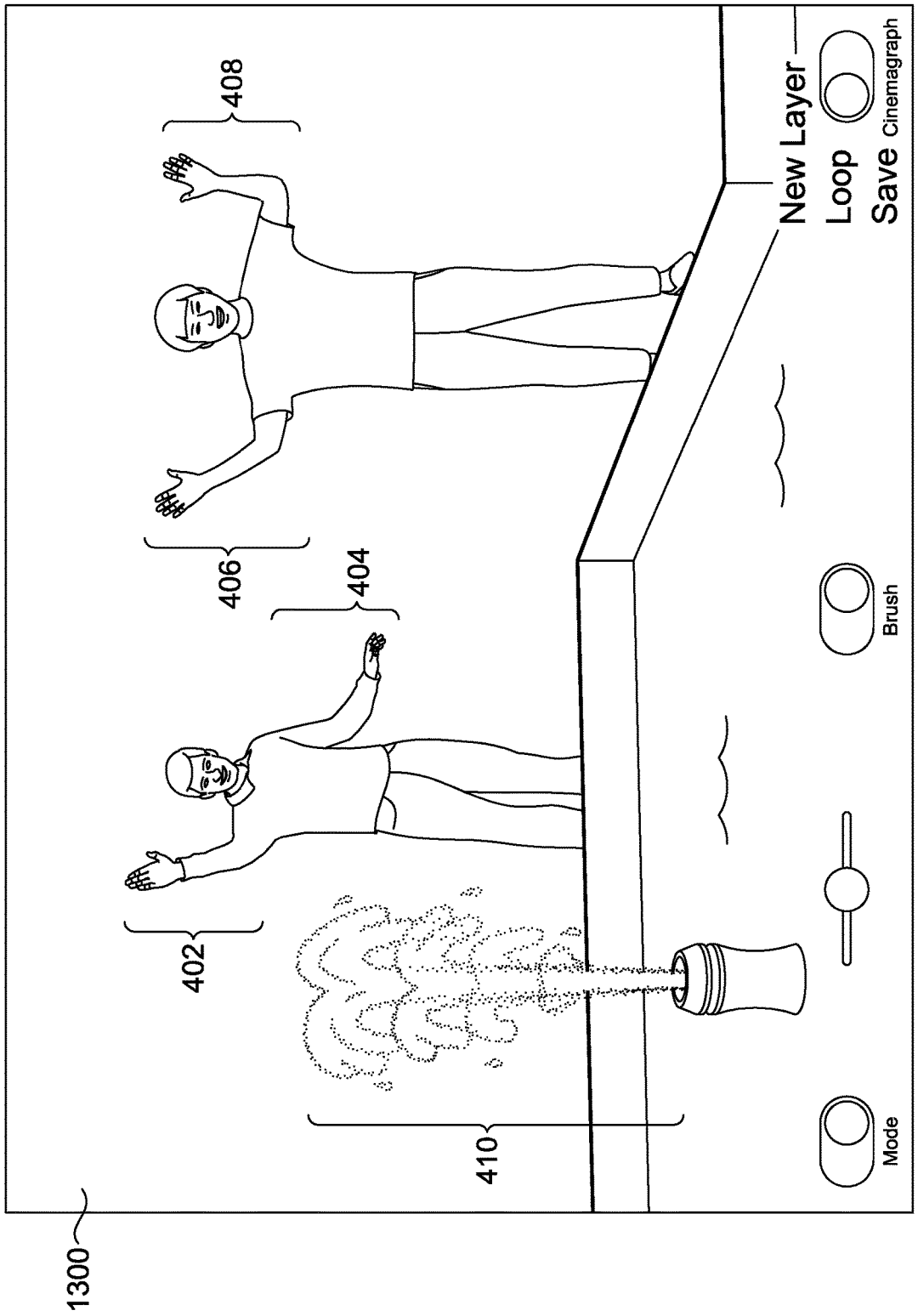
Figure 13D:
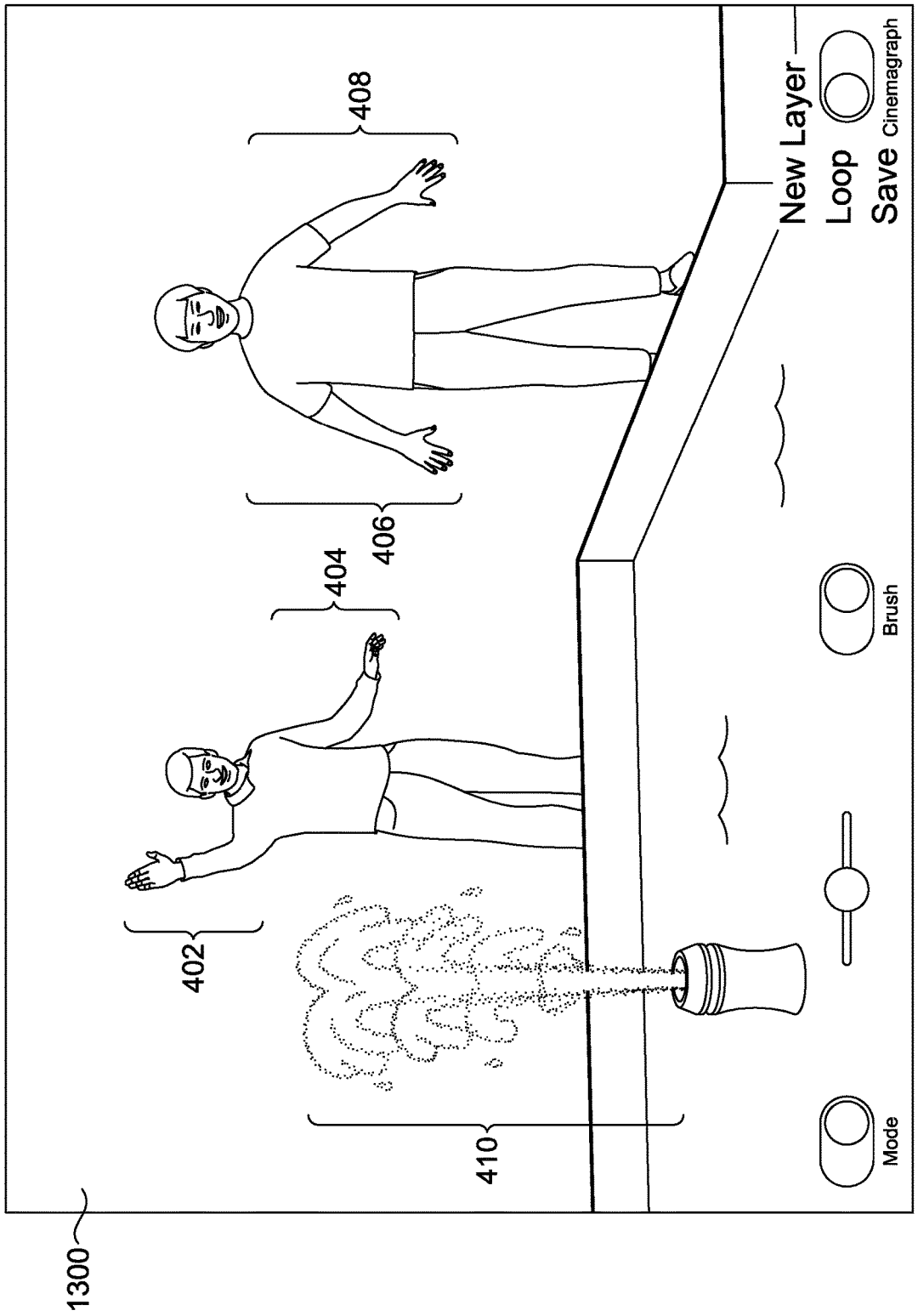

Sets of frames may be combined with selective virtual LE images to create a cinemagraph with at least an animated portion replacing a blurred portion of the original virtual LE image and a non-animated, non-blurred portion replacing a second blurred portion of the original virtual LE image. This cinemagraph may be created by selecting the region for either the non-animated portion or the animated portion first. For example, a user may first select region 812 and an individual frame, such as frame 912, and the selective virtual LE image, such as selective virtual LE image 910, will be presented on the graphic user for the user to select region 412 for animation, as shown in FIG. 11. In this case, the process for creating the cinemagraph may be the same as described above with respect to FIGS. 4A-7D except that the selective virtual LE image is used for the virtual LE image. Because the selective virtual LE image comprises the original virtual LE image 400 and an individual frame, such as frame 912, increasing the transparency of the selective virtual LE image at region 812 comprises increasing the transparency of the original virtual LE image 400 and the individual frame 912. Additionally, both the virtual LE image 400 and the individual frame 912 are rendered on top of the set of frames identified for animation. FIG. 12 depicts the virtual LE image 400 overlaying individual frame 912, which is overlaying the stack of frames, and FIGS. 13A, 13B, 13C, and 13D depict the created cinemagraph 1300 at different points in the frame sequence for regions 406 and 408 with a portion of frame 912 being visible for at least regions 402 and 404. As illustrated through FIGS. 13A-13D, the resulting cinemagraph may comprise a blurry portion (region 410), non-blurred, non-animated portion depicting a stationary element (regions 402 and 404), and an animated portion (regions 406 and 408).

The selective virtual LE image may be also created after the cinemagraph. For example, after a user selects region 812 for animation, a set of frames are identified, and a cinemagraph is created, a user can select region 412 for replacing with individual frame 912. A modified cinemagraph may then by created through creating a selective virtual LE image with an individual frame, such as frame 912, and the set of frames 600. The individual frame 912 may still be rendered over the set of frames 600 for the animation just as in FIG. 12, and the transparency of the individual frame 912 is increased at region 812 to provide visibility to the set of frames 600. In other words, the set of frames for animation may always form the bottom layers of the cinemagraph regardless of the order in which the cinemagraph and selective virtual LE image are created. In some embodiments, user is presented with a selectable option for creating either the selective virtual LE image or the cinemagraph. For example, the user may select a switch component 1102 on the user interface illustrated in FIG. 11 to turn on or off creating cinemagraphs. When the switch component 1102 is on, as in FIG. 11, any selected region is selected for animation, and when the switch component 1102 is off, any selected region is replaced with an individual frame to create a selective virtual long-exposure image.

Accordingly, in an embodiment of the disclosure reduced to practice, an aligned stack of images, denoted as $\mathcal{A} = \{I_i^{(a)}; i \in \{1, \ldots, N\}\}$, is obtained from a plurality of frames $\{I_i; i \in \{1, \ldots, N\}\}$, such as a burst of images. The resultant photo $\mathcal{L}$ (the original virtual LE image) is the aggregation of the aligned images. The original virtual LE image $\mathcal{L}$ is displayed to the user and has the long-exposure effect in one or more regions. Using the original virtual LE image $\mathcal{L}$, a selective virtual LE image $\mathcal{S}$ may be created with a portion of the virtual LE image $\mathcal{L}$ being visibly replaced with one of the frames $\{I_i; i \in \{1, \ldots, N\}\}$. To this end, one or more regions $R_j$ of the virtual LE image $\mathcal{L}$ is selected by the user to be presented as a still image, and the user selects a corresponding aligned frame $I_{s(j)}^{(a)}$ to replace the content within that region of virtual LE image $\mathcal{L}$. Further, a user can select a different region, denoted as $C_k$, of the selective virtual LE image $\mathcal{S}$ in which the long-exposure effect is to be replaced by an animation. The animation may be a loop of a range of L frames, where $F_{Loop} = \{f_1, \ldots, f_L\}$ with a smooth transition between $f_L$ and $f_1$, or the animation may be a bounce through frames, where $F_{Loop} = \{f_1, \ldots, f_L, f_{L-1}, f_{L-2}, \ldots, f_1\}$.

Given aligned images $\mathcal{A}$, K selected regions $R_j$; $j \in \{1, \ldots, K\}$ and corresponding aligned frames $\{I_{s(j)}^{(a)}; j \in \{1, \ldots, K\}\}$, M selected regions $C_k$; $k \in \{1, \ldots, M\}$ and corresponding range of looping or bouncing frames $F_{Loop}$, a cinemagraph consisting of L frames may be created with each frame denoted as $\{\mathcal{F}_l; l \in \{1, \ldots, L\}\}$. Creating the cinemagraph may be done by starting with the virtual LE image $\mathcal{L}$, setting $\mathcal{S} = \mathcal{L}$, and then for each selected region $R_j$; $j \in \{1, \ldots, K\}$, the following processes are performed:

Gaussian smoothing with kernel size d and sigma σ is applied on $R_j$ to obtain $R_j^{(s)}$.

Alpha channel of $\mathcal{S}$ is set to $R_j^{(s)}$ to get $\mathcal{S}_j$.

An individual aligned frame $I_{s(j)}^{(a)}$ is rendered with $\mathcal{S}_j$ (which has one or more transparent regions) being rendered over $I_{s(j)}^{(a)}$, effectively resulting in alpha blending of $I_{s(j)}^{(a)}$ and $\mathcal{S}_j$.

Set $\mathcal{S}$ equal to the blending result.

For each frame $\mathcal{F}_l$; $l \in F_{Loop}$, the frame l of the cinemagraph over a long-exposure sequence, start with $\mathcal{F}_l \mathcal{S}$. As such, additional regions are selected for animation and for each new selected region $C_k$; $k \in \{1, \ldots, M\}$, the following processes are performed:

Gaussian smoothing with kernel size d and sigma σ is applied on $C_k$ to obtain $C_k^{(s)}$.

Alpha channel of $\mathcal{F}_l$ is set to $C_k^{(s)}$ to get $\mathcal{F}_{l,k}$.

Sequence of frame for the loop $I_{f_l}^{(a)}$ is rendered with $\mathcal{F}_{l,k}$ (which has one or more transparent regions) being rendered over $I_{f_l}^{(a)}$, effectively resulting in alpha blending of $I_{f_l}^{(a)}$ and $\mathcal{F}_{l,k}$.

Exemplary Implementations of Cinemagraph Generation Using Virtual LE Images

Figure 14:
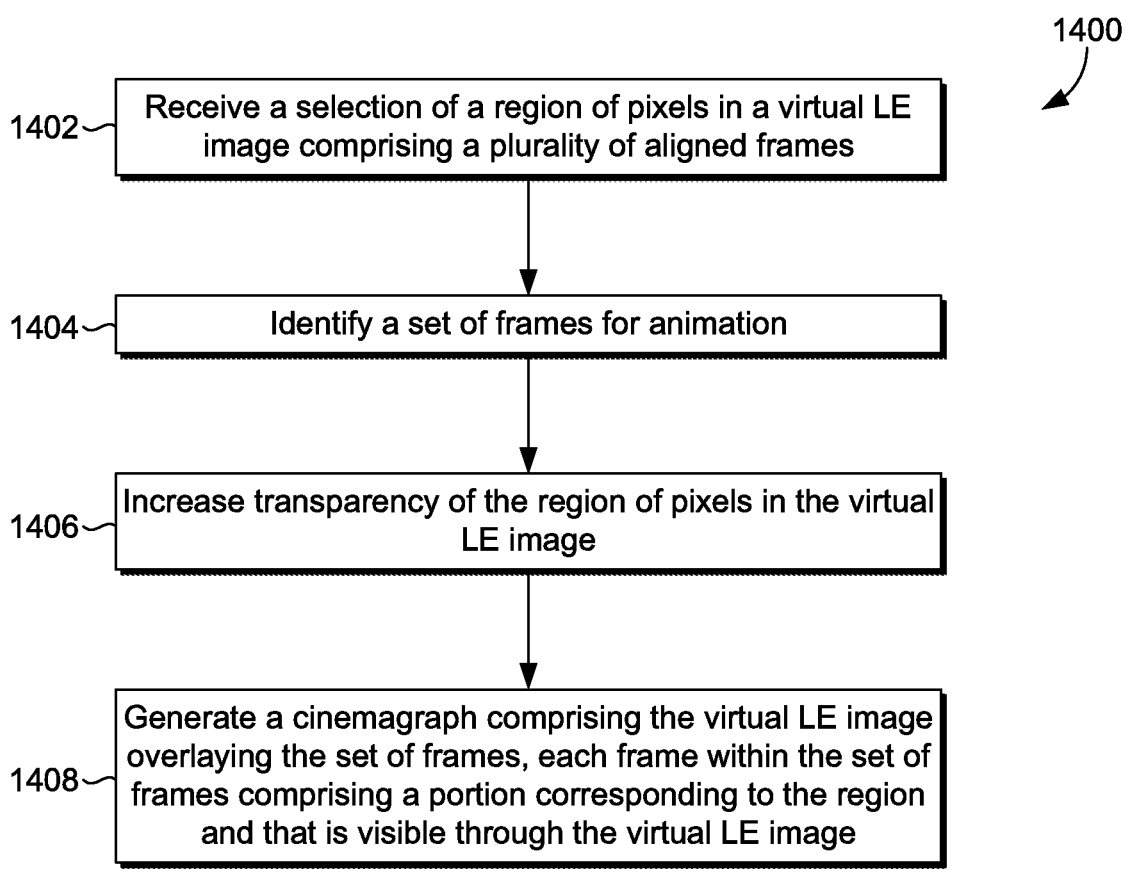
FIGS. 14 and 15 are flow diagrams showing methods of creating cinemagraphs using virtual LE images in accordance with embodiments of the present disclosure.

Referring now to FIG. 14, a flow diagram is provided showing an embodiment of a method 1400 for generating a cinemagraph with a virtual long-exposure image. Each block of method 1400 and other methods described herein, including method 1500 of FIG. 15, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The blocks of the method may be performed in whole or in part by the long-exposure cinemagraph manager 210 of FIG. 2.

Initially, at block 1402, a selection of a region of pixels in a virtual LE image is received. The virtual LE image comprises a plurality of aligned frames, such as SE frames. The region of pixels may be selected by user input via a mouse, touch display, and the like. In some embodiments, a smoothing process, such as Gaussian smoothing, automatically occurs at the selected region of pixels in the virtual LE image. At block 1404, a set of frames for animation are identified from the plurality of aligned frames. The set of frames may be identified by automatic detection of a loop based on movement captured in the selected region, or the set may be identified by receiving a user-selected range of frames. At block 1406, the transparency of the virtual LE image at the selected region is increased. The transparency may be increased by adjusting the alpha channel of the virtual LE image.

At block 1408, a cinemagraph is generated from the virtual LE image and the set of frames. The cinemagraph may be created by arranging the virtual LE image to overlay the set of frames for animation. Each frame within the set of frames comprises a portion corresponding to or aligned with the selected region of pixels in the virtual LE image. This portion of each frame is visible through the virtual LE image to collectively form an animated portion of the cinemagraph. In other words, when the cinemagraph is rendered for presentation on a user interface, the cinemagraph is presented as a visible portion of the virtual LE image and an animated visible portion of the set of frames aligned with the selected region of pixels. The cinemagraph may be saved as an animation or video file.

Figure 15:
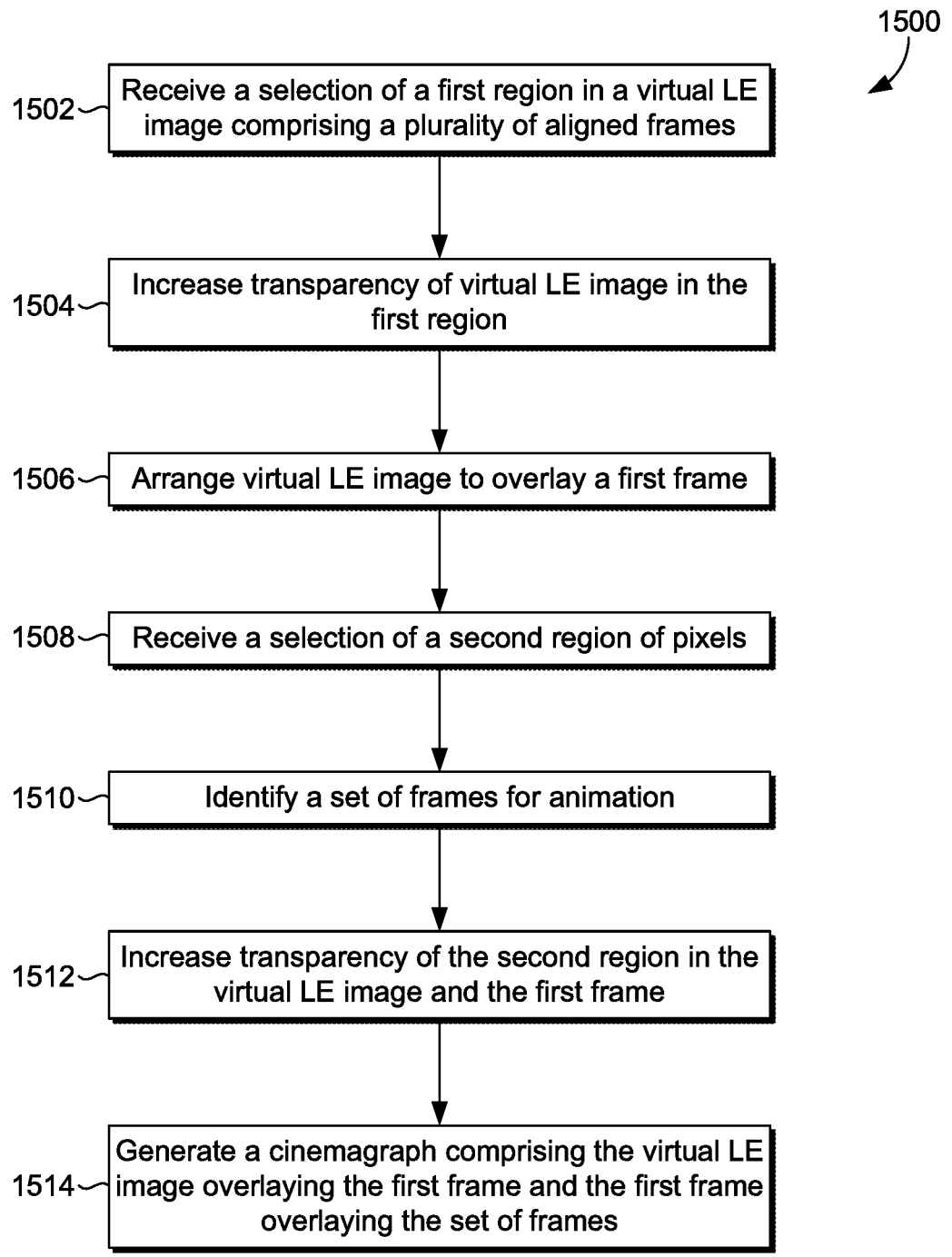

Referring now to FIG. 15, a flow diagram is provided showing another embodiment of a method 1500 for generating a cinemagraph using a long-exposure image. Initially, at block 1502, a selection of a first region of pixels in a virtual LE image is received, and at block 1504, the transparency of the virtual LE image at the selected first region of pixels is increased. At block 1506, the virtual LE image is arranged to overlay a first individual frame. The first frame may be selected by the user from the plurality of aligned frames forming the virtual LE image. When arranged, a portion of the first frame that is aligned with the first region of pixels is visible through the virtual LE image. In this way, a first blurred portion of the virtual LE image may be replaced with a single frame to present elements within that region with a sharper representation.

Continuing, method 1500 further comprises, at block 1508, receiving a selection of a second region of pixels. At block 1510, based on the selected second region, a set of frames for animation are identified from the plurality of aligned frames forming the virtual LE image. The set of frames may be identified by automatic detection of a loop based on movement captured in the selected region, or the set may be identified by receiving a user-selected range of frames. At block 1512, the transparency of the virtual LE image and the first individual frame is increased at the second region. At block 1514, a cinemagraph is generated from the virtual LE image, the first individual frame, and the set of frames. The virtual LE image overlays the first frame while the first frame overlays the set of frames for animation. Each frame within the set of frames comprises a portion corresponding to or aligned with the selected second region of pixels in the virtual LE image. This portion of each frame is visible through both the first frame and the virtual LE image to collectively form an animated portion of the cinemagraph. When the cinemagraph is rendered for presentation on a user interface, the cinemagraph is presented as a visible portion of the virtual LE image, a visible portion of the first frame aligned with the first region of pixels, and an animated visible portion of the set of frames aligned with the selected region of pixels.

Exemplary Operating Environment

Figure 16:
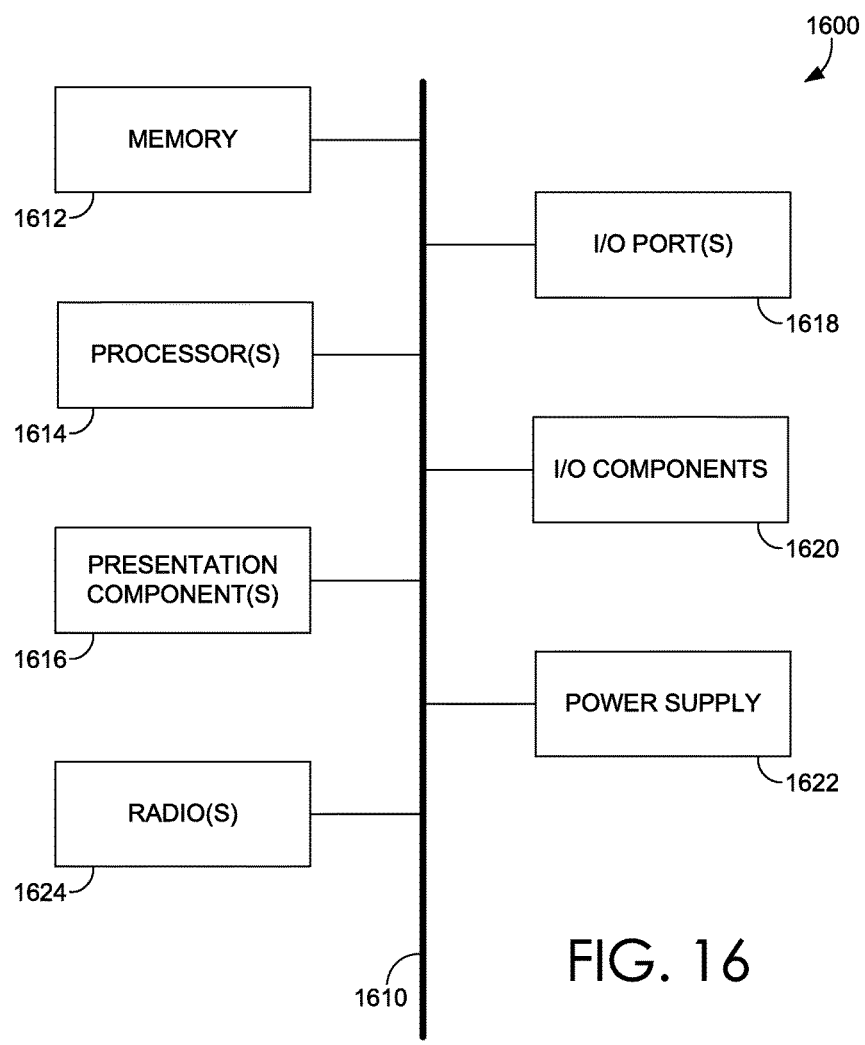
FIG. 16 is a block diagram of an exemplary computing environment suitable for use in implementations of the present disclosure.

Turning now to FIG. 16, FIG. 16 provides a diagram of an exemplary computing environment suitable for use in implementation of the present disclosure. Computing device 1600 includes bus 1610 that directly or indirectly couples the following devices: memory 1612, one or more processors 1614, one or more presentation components 1616, input/output (I/O) ports 1618, input/output components 1620, and illustrative power supply 1622. Bus 1610 represents what may be one or more busses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 16 is merely illustrative of an exemplary computing device that can be used in connection with one or more embodiments of the present invention. Distinction is not made between such categories as "workstation," "server," "laptop," "handheld device," etc., as all are contemplated within the scope of FIG. 11 and reference to "computing device."

Computing device 1600 typically includes a variety of computer-readable media. Computer-readable media can be any available media that can be accessed by computing device 1600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1612 includes computer-storage media in the form of volatile and/or nonvolatile memory. The memory may be removable, non-removable, or a combination thereof. Exemplary hardware devices include solid-state memory, hard drives, optical-disc drives, etc. Computing device 1600 includes one or more processors that read data from various entities such as memory 1612 or I/O components 1620. Presentation component(s) 1616 present data indications to a user or other device. Exemplary presentation components include a display device, speaker, printing component, vibrating component, etc.

I/O ports 1618 allow computing device 1600 to be logically coupled to other devices including I/O components 1620, some of which may be built in. Illustrative components include a microphone, joystick, game pad, satellite dish, scanner, printer, wireless device, etc. The I/O components 1620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1600. The computing device 1600 may be equipped with depth cameras, such as stereoscopic camera systems, infrared camera systems, RGB camera systems, and combinations of these, for gesture detection and recognition. Additionally, the computing device 1600 may be equipped with accelerometers or gyroscopes that enable detection of motion. The output of the accelerometers or gyroscopes may be provided to the display of the computing device 1600 to render immersive augmented reality or virtual reality.

As can be understood, implementations of the present disclosure provide for facilitating creation of cinemagraphs using virtual LE images. The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer system comprising:
   a processor; and
   a computer storage medium having computer-usable instructions that, when used by the processor, cause the processor to:
   receive a selection of a region of pixels in a virtual long-exposure image, the virtual long-exposure image comprising a plurality of frames that are aligned based on similarity of pixels, wherein the region of pixels selected includes a blurred portion of the virtual long-exposure image;
   identify a set of frames for animation, the set of frames being at least a portion of the plurality of frames;
   increase a transparency level of the region of pixels in the virtual long-exposure image; and
   generate a cinemagraph comprising the virtual long-exposure image overlaying the set of frames, wherein each frame within the set of frames comprise a portion that corresponds to the region of pixels and is visible through the virtual long-exposure image.

2. The computer system of claim 1, wherein increasing the transparency level of the region of pixels in the virtual long-exposure image comprises adjusting an alpha channel.

3. The computer system of claim 1, wherein the computer-usable instructions further cause the processor to, upon receiving the selection of the region of pixels, perform smoothing to the region of pixels.

4. The computer system of claim 3, wherein smoothing is performed with a kernel size corresponding to a brush size and a sigma corresponding to a brush hardness.

5. The computer system of claim 1, wherein the region of pixels comprises at least a first grouping of pixels and a second grouping of pixels separated from the first grouping by a non-selected grouping pixels.

6. The computer system of claim 1, wherein identifying the set of frames for animation comprises automatically detecting a frame sequence for a loop based on movement between frames within the region of pixels selected.

7. The computer system of claim 1, wherein identifying the set of frames for animation comprises receiving a selection of a range of frames from the plurality of frames.

8. One or more non-transitory computer-readable media having a plurality of executable instructions embodied thereon, which, when executed by one or more processors, cause one or more processors to perform a method comprising:
   receiving a selection of a region of pixels in a virtual long-exposure image, the virtual long-exposure image comprising a plurality of frames that are aligned based on a similarity of pixels, wherein the region of pixels selected includes a first blurred portion of the virtual long-exposure image; and
   presenting a cinemagraph on a graphic user interface, the cinemagraph comprising a visible portion of the virtual long-exposure image and a visible animation created from a set of frames from the plurality of frames, wherein the visible animation corresponds to the region of pixels.

9. The computer-readable media of claim 8, wherein the method further comprises automatically detecting a set of frames for forming a loop based on movement captured between frames within the region of pixels.

10. The computer-readable media of claim 8, wherein the method further comprises, prior to presenting the cinemagraph on a graphic user interface, increasing a transparency level for the region of pixels selected from the virtual long-exposure image.

11. The computer-readable media of claim 10, wherein presenting the cinemagraph on a graphic user interface comprises rendering the set of frames for animation and rendering the virtual long-exposure image over the set of frames.

12. The computer-readable media of claim 8, wherein the method further comprises:
   receiving a selection of a second region of pixels in the cinemagraph, the second region of pixels being different from the first region of pixels;
   increasing a transparency level for the second region of pixels in the cinemagraph; and
   creating a modified cinemagraph, the modified cinemagraph having the virtual long-exposure image overlaying the set of frames for animation and the set of frames overlaying a single frame selected from the plurality of frames, wherein the modified cinemagraph comprises a second blurred portion visible from the virtual long-exposure image, an animated portion visible from the set of frames, and a non-blurred and non-animated portion visible from the single frame.

13. The computer-readable media of claim 12, wherein the single frame is selected for the second region by a user via a slider object on the graphic user interface.

14. The computer-readable media of claim 12, wherein the single frame is the same as one of the frames in the set of frames for animation.

15. The computer-readable media of claim 8, wherein the method further comprises saving the cinemagraph as an infinite loop GIF file.

16. A system comprising:
   a means for providing a virtual long-exposure image having one or more blurred regions from a plurality of short-exposure frames, the means for providing the virtual long-exposure image comprising aggregating the plurality of short-exposure frames into a stack of frames and aligning frames based on similarity of background pixels at each pixel location within the stack, wherein the one or more blurred regions result from aggregating the plurality of short-exposure frames; and
   a means for creating a cinemagraph from the virtual long-exposure image, the cinemagraph comprising a non-animated portion of the virtual long-exposure image and an animated portion created from set of frames from the plurality of short-exposure frames, the means for creating the cinemagraph comprising:
receiving a selection of a first region of pixels from the virtual long-exposure image, the first region including a first blurred region of the one or more blurred regions;
identifying the set of frames for animation; and
replacing the first region of pixels selected from the virtual long-exposure image with the animated portion created from the set of frames.

17. The system of claim 16, wherein providing the virtual long-exposure image further comprises providing a selective virtual long-exposure image, providing the selective virtual long-exposure image comprising:
receiving a selection of a second region of pixels in the virtual long-exposure image, the second region including a second blurred region of the one or more blurred regions,
increasing a transparency level of the virtual long-exposure image in the second region of pixels, and
arranging the virtual long-exposure image to overlay a single frame from the plurality of short-exposure frames, wherein the single frame replaces the second blurred region with a non-blurred region.

18. The system of claim 17, wherein replacing the first region of pixels with the animated portion comprises:
increasing a transparency level of the selective virtual long-exposure image at the first region of pixels; and
overlaying the selective virtual long-exposure image over the set of frames, wherein each frame within the set of frames comprises a portion corresponding to the first region of pixels and is visible through the selective virtual long-exposure image.

19. The system of claim 18, wherein increasing a transparency level of the selective virtual long-exposure image comprises increasing a transparency level of the virtual long-exposure image and a transparency level of the single frame, and wherein, when the cinemagraph is presented for display on a graphic user interface, a portion of the single frame is visible through the virtual long-exposure image at the second region of pixels and a portion of each frame within the set of frames is visible through the single frame and the virtual long-exposure image at the second region of pixels.

20. The computer system of claim 1, wherein the plurality of frames that are aligned based on similarity of pixels are merged to create a single layer comprising the virtual long-exposure image.

* * * * *